US012663381B2

(12) United States Patent
Colle et al.

(10) Patent No.: US 12,663,381 B2
(45) Date of Patent: Jun. 23, 2026

(54) OPTICAL COMPUTING METHODS AND SYSTEMS FOR INSPECTING A GLASS CONTAINER IN TRANSMITTED LIGHT

(71) Applicant: TIAMA, St. Genis-Laval (FR)

(72) Inventors: Olivier Colle, Oullins (FR); Raphaël Druetto, Oullins (FR)

(73) Assignee: TIAMA, St. Genis-Laval (FR)

( * ) Notice: Subject to any disclaimer, the term of this patent is extended or adjusted under 35 U.S.C. 154(b) by 152 days.

(21) Appl. No.: 18/833,785

(22) PCT Filed: Jan. 27, 2023

(86) PCT No.: PCT/FR2023/050113
§ 371 (c)(1),
(2) Date: Jul. 26, 2024

(87) PCT Pub. No.: WO2023/144494
PCT Pub. Date: Aug. 3, 2023

(65) Prior Publication Data
US 2024/0385123 A1     Nov. 21, 2024

(30) Foreign Application Priority Data
Jan. 28, 2022    (FR) ...................................... 2200767

(51) Int. Cl.
*G01N 21/90*        (2006.01)
*G01N 21/88*        (2006.01)
(52) U.S. Cl.
CPC ..... *G01N 21/9036* (2013.01); *G01N 21/8806* (2013.01); *G01N 2021/8848* (2013.01)
(58) Field of Classification Search
None
See application file for complete search history.

(56) References Cited

U.S. PATENT DOCUMENTS

| | | | |
|---|---|---|---|
| 4,487,322 A | 12/1984 | Juvinall | |
| 4,606,634 A | 8/1986 | Bieringer | |

(Continued)

FOREIGN PATENT DOCUMENTS

| | | | | |
|---|---|---|---|---|
| DE | 10 2014 220598 A1 | 4/2016 | | |
| DE | 102018004539 A1 * | 12/2019 | ......... | G01N 21/9036 |

(Continued)

OTHER PUBLICATIONS

International Search Report issued in PCT/FR2023/050113 dated May 10, 2023 (7 pages).

*Primary Examiner* — Michael P Stafira
(74) *Attorney, Agent, or Firm* — ROTHWELL, FIGG, ERNST & MANBECK, P.C.

(57) ABSTRACT

There are provided an optical computing method and system for inspecting in through light a container. The container is illuminated by elementary emitting areas each emitting a polarized emitted light with an emitted polarization property of interest that varies according to a law of periodic variation which, over a primary period, follows a triangular variation as a function of the position of the elementary emitting area along the primary direction. Digital images are acquired, with at least one camera, with interposition of a linear analyzer having a given axis of polarization for a partial digital image. At least one primary raw refraction image is calculated, each pixel of which is representative of the refraction undergone by the light. The system advantageously includes a two-dimensional matrix of liquid crystal cells.

16 Claims, 7 Drawing Sheets

(56) References Cited

U.S. PATENT DOCUMENTS

| | | | |
|---|---|---|---|
| 4,610,542 A | 9/1986 | Ringlien | |
| 4,924,083 A * | 5/1990 | Ishikawa | G01N 21/90 |
| | | | 356/239.5 |
| 6,618,495 B1 | 9/2003 | Furnas | |
| 7,120,284 B2 * | 10/2006 | Furnas | G01N 21/90 |
| | | | 382/142 |
| 7,781,723 B1 | 8/2010 | Furnas | |
| 8,238,026 B1 * | 8/2012 | Kemme | G01N 21/21 |
| | | | 359/489.17 |
| 9,551,671 B2 | 1/2017 | Colle et al. | |
| 11,193,893 B2 | 12/2021 | Heuft et al. | |
| 2005/0013473 A1 * | 1/2005 | Furnas | G01N 21/90 |
| | | | 382/142 |
| 2010/0110174 A1 | 5/2010 | Leconte | |
| 2013/0215261 A1 | 8/2013 | Rahmani et al. | |
| 2022/0236193 A1 | 7/2022 | Niedermeier | |

FOREIGN PATENT DOCUMENTS

| | | | | |
|---|---|---|---|---|
| DE | 10 2019 208299 A1 | | 12/2020 | |
| DE | 102019208296 A1 * | | 12/2020 | G01N 21/8851 |
| EP | 0344617 A2 | | 12/1989 | |
| EP | 1006350 A1 | | 6/2000 | |
| EP | 1109010 A1 * | | 6/2001 | G01N 21/9036 |
| EP | 1980843 A1 | | 10/2008 | |
| EP | 2082216 B1 | | 2/2012 | |
| EP | 2875339 B1 | | 9/2016 | |
| EP | 2558847 B1 | | 8/2018 | |
| EP | 3552001 A1 | | 10/2019 | |
| EP | 3679356 A1 | | 7/2020 | |
| FR | 2794241 A1 | | 12/2000 | |
| FR | 2794242 A1 | | 12/2000 | |
| FR | 2958040 A1 | | 9/2011 | |
| FR | 3 082 307 A1 | | 12/2019 | |
| JP | 2000046754 A | * | 2/2000 | G01N 21/9036 |
| JP | 2002513463 A | * | 5/2002 | G01N 21/21 |
| JP | 2003215057 A | * | 7/2003 | G01N 21/9027 |
| JP | 2016 099227 A | | 5/2016 | |
| JP | 2019174150 A | * | 10/2019 | |
| JP | 2020118557 A | * | 8/2020 | |
| WO | WO-0233390 A1 | * | 4/2002 | G01N 21/90 |
| WO | 2018106894 A1 | | 6/2018 | |
| WO | WO-2018158824 A1 | * | 9/2018 | G01N 21/90 |
| WO | WO-2019012858 A1 | * | 1/2019 | H04N 5/265 |
| WO | 2020212014 A1 | | 10/2020 | |
| WO | WO-2020244815 A1 | * | 12/2020 | G01N 21/90 |
| WO | WO-2020244817 A1 | * | 12/2020 | G01N 21/8806 |
| WO | WO-2020244818 A1 | * | 12/2020 | G01N 21/9036 |

* cited by examiner

[Fig. 1]
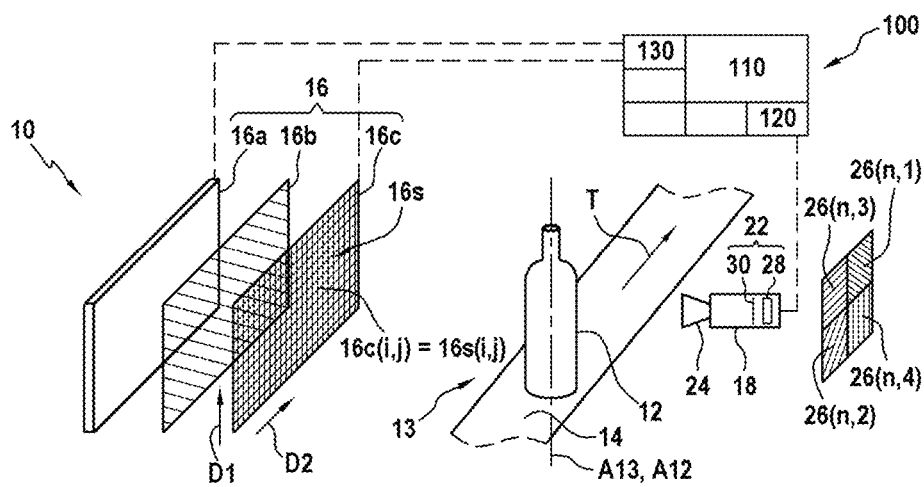
[Fig. 2]
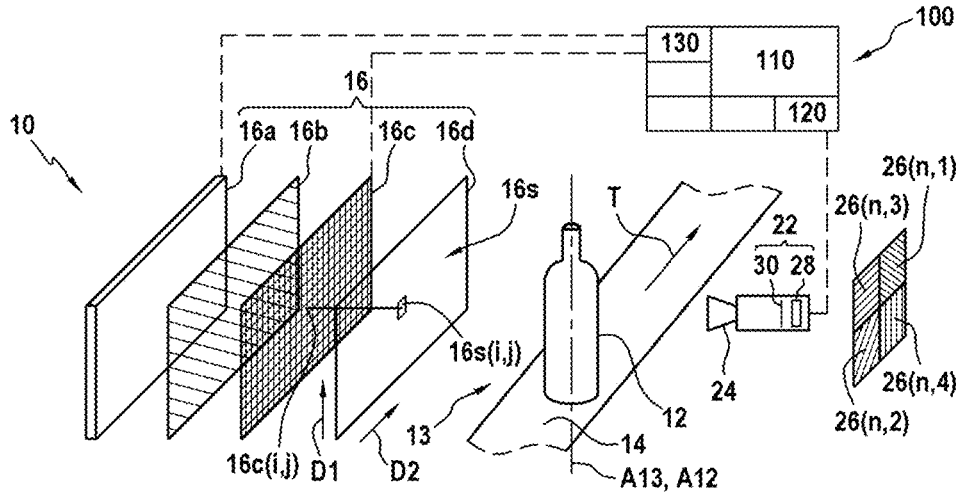
[Fig. 3]
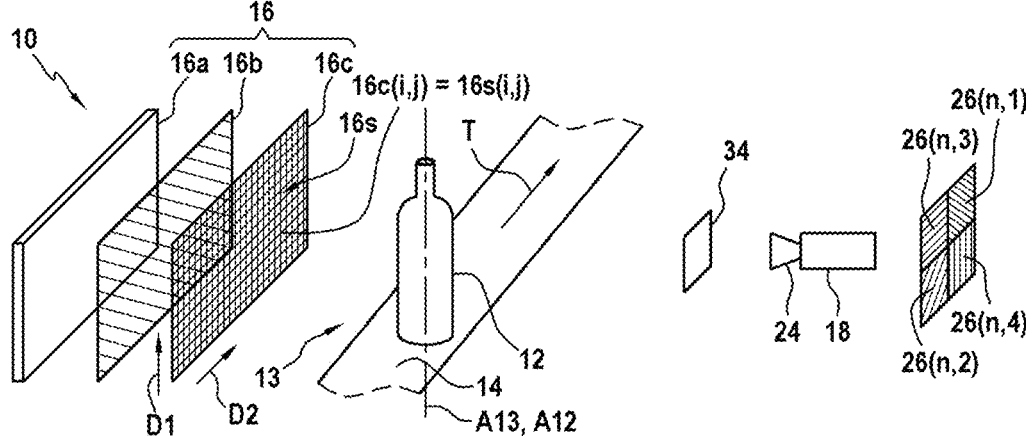

[Fig. 4]
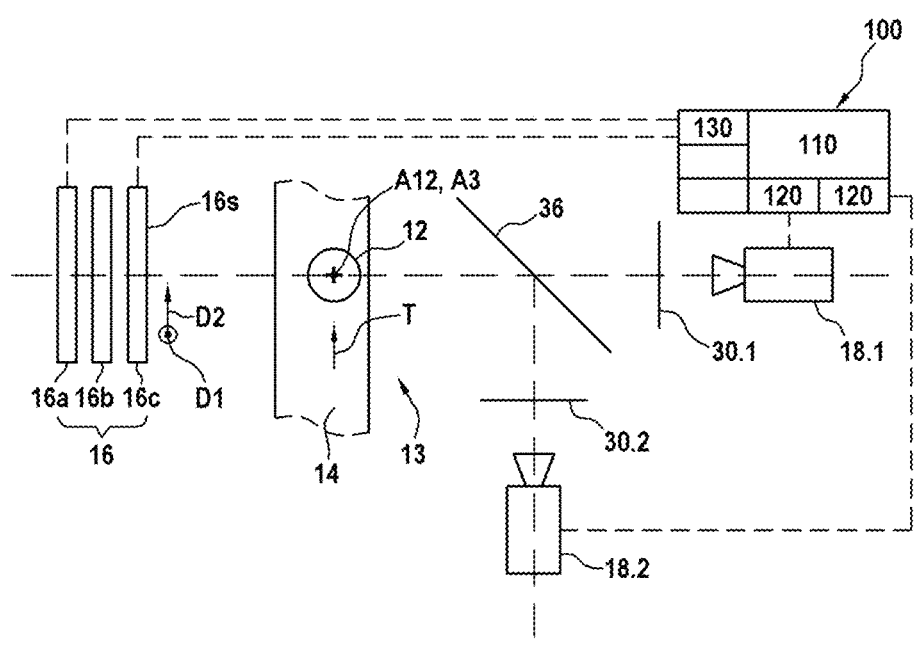
[Fig. 5]
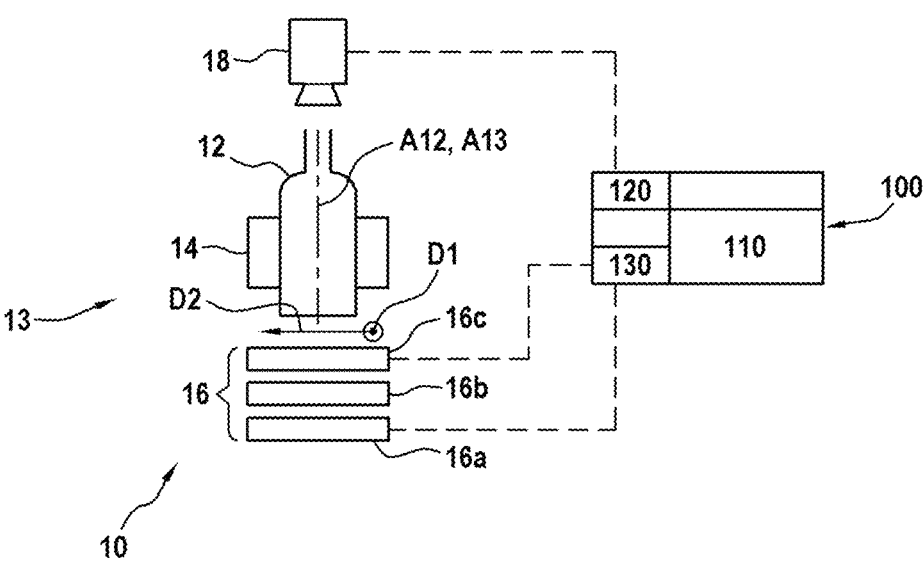

[Fig. 6]
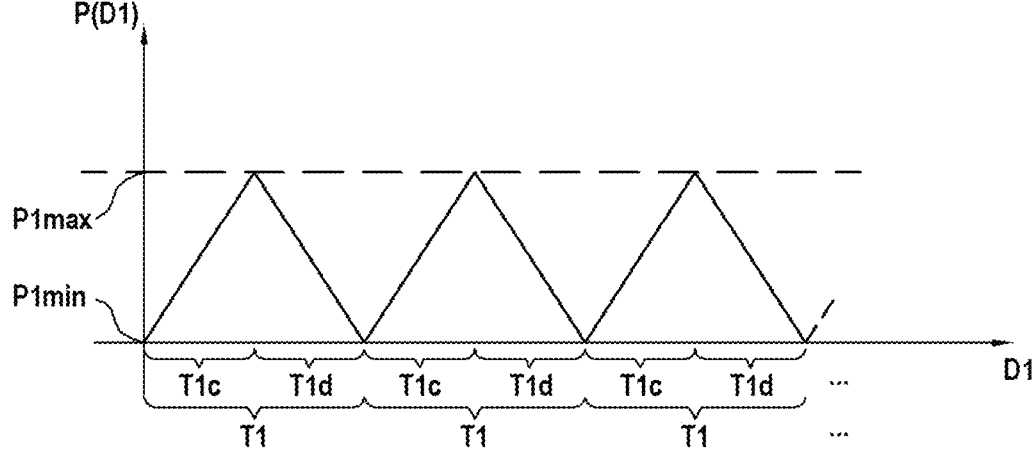
[Fig. 7]
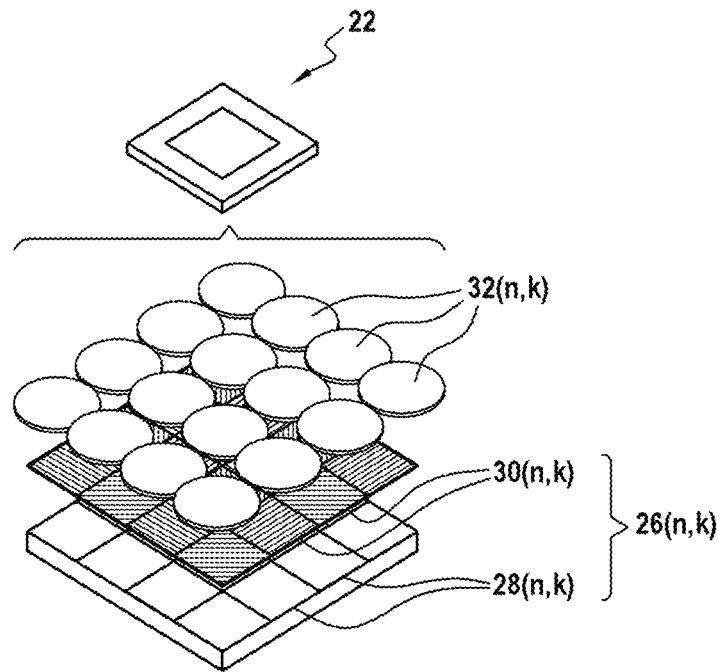

[Fig. 8]
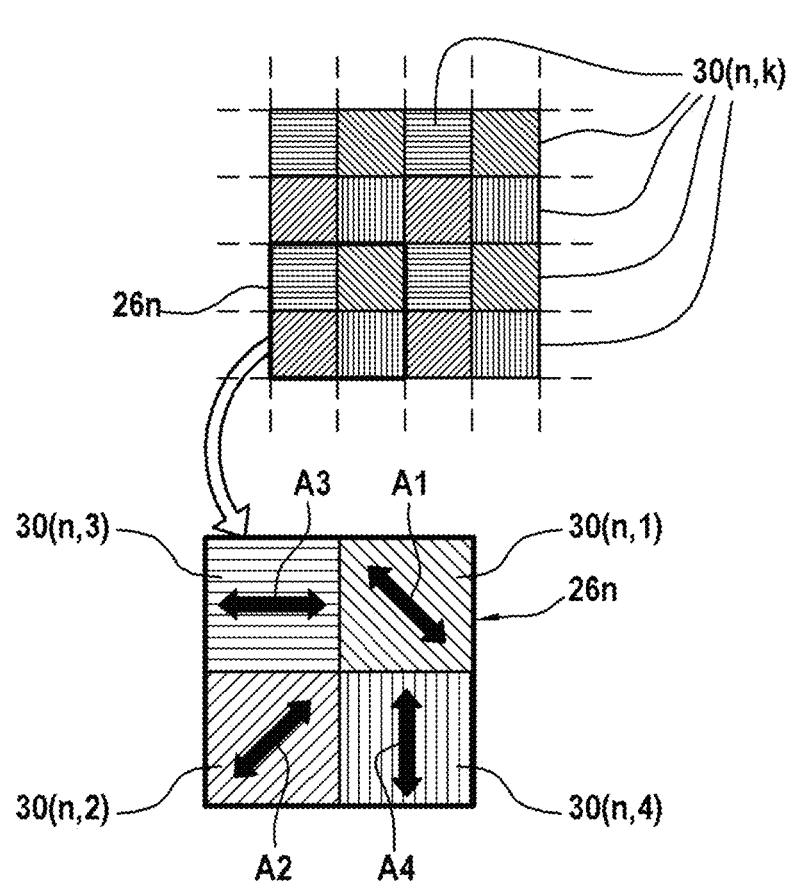

[Fig. 9]
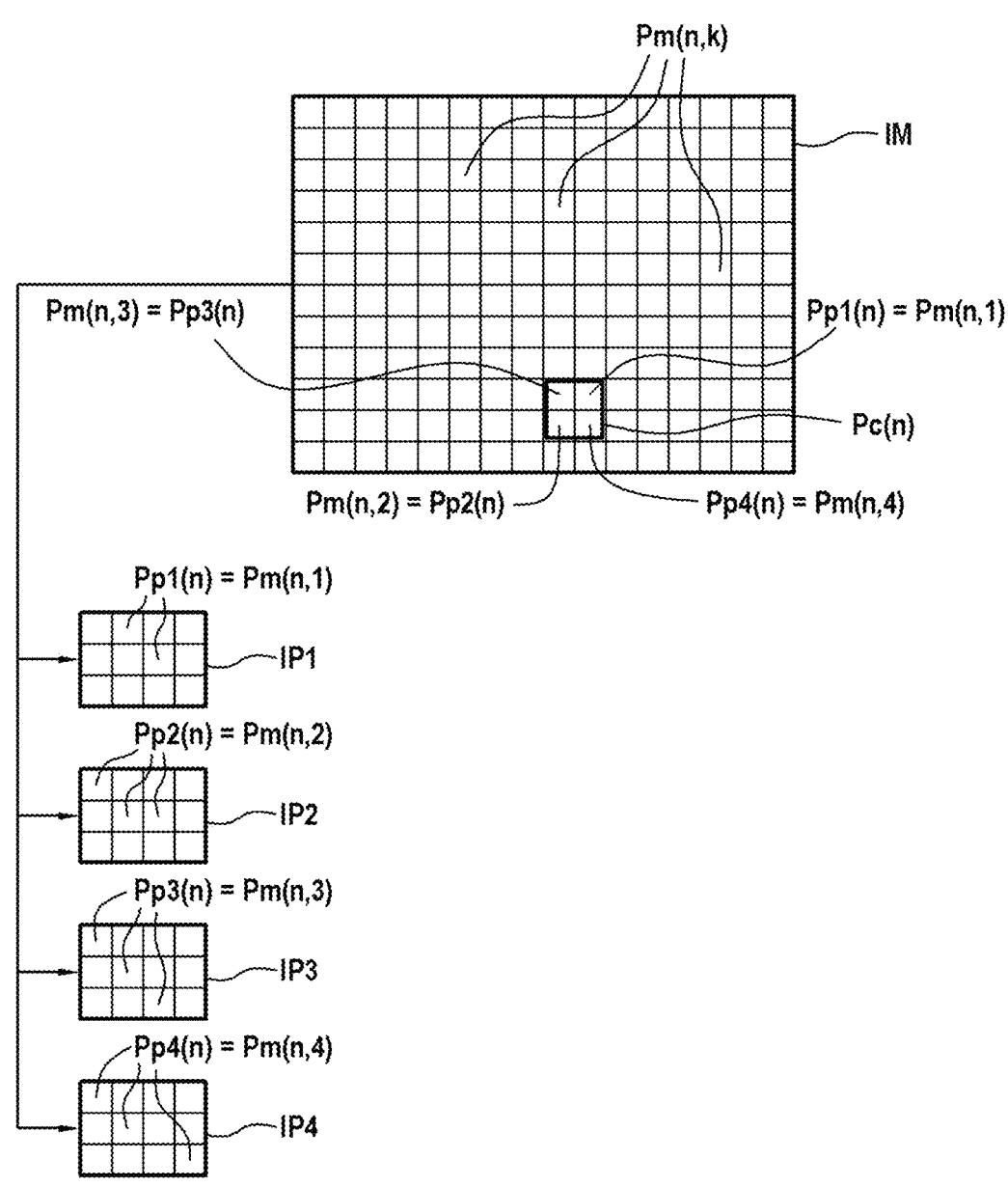

[Fig. 10]
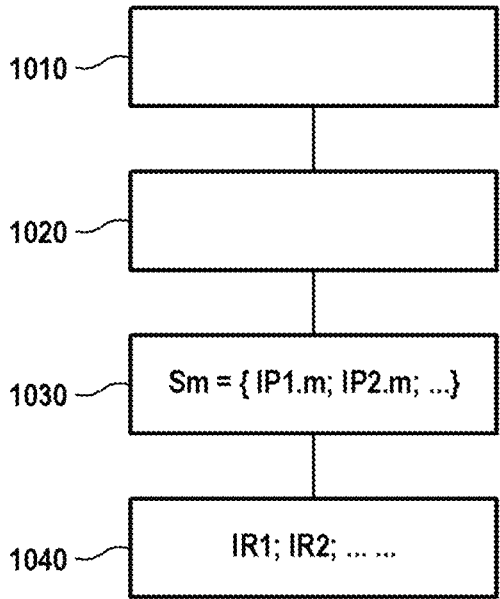
[Fig. 11]
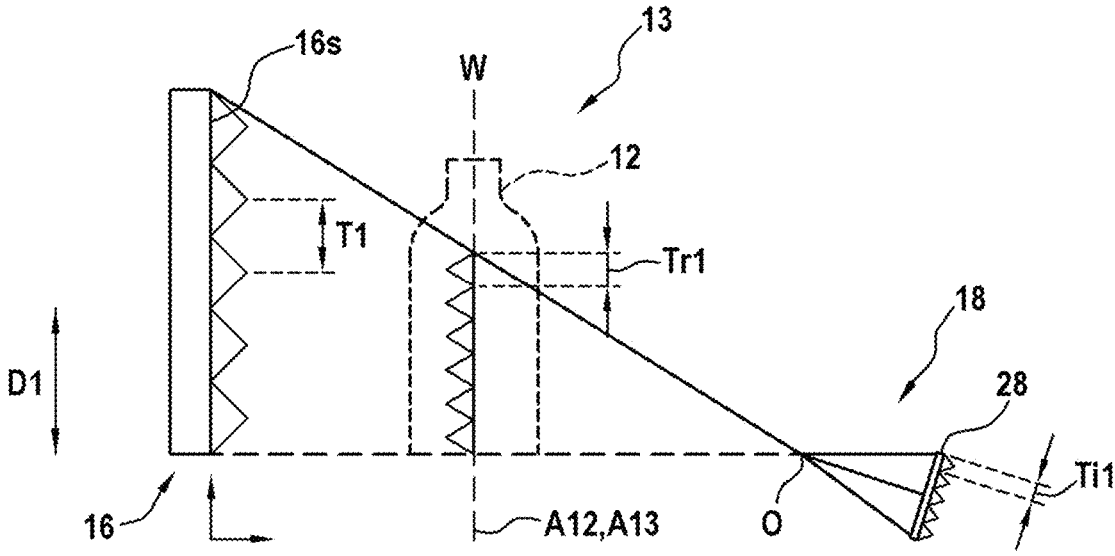

[Fig. 12]
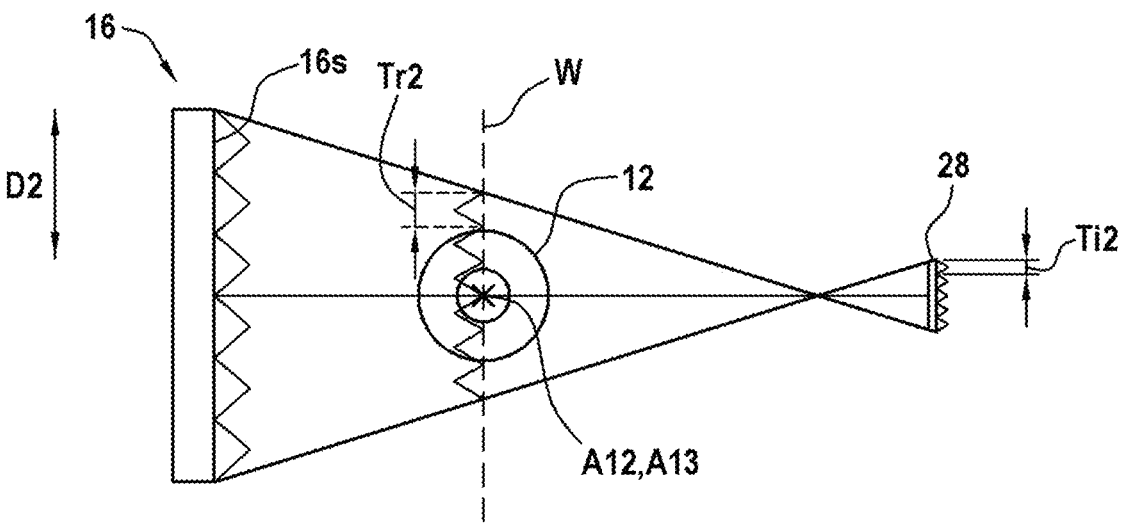

OPTICAL COMPUTING METHODS AND SYSTEMS FOR INSPECTING A GLASS CONTAINER IN TRANSMITTED LIGHT

CROSS REFERENCE TO RELATED APPLICATIONS

This application is a 35 U.S.C. § 371 National Stage of International Patent Application No. PCT/FR2023/050113, filed 2023 Jan. 27, which claims priority to French Patent Application No. 2200767, filed 2022 Jan. 28. The above identified applications are incorporated by this reference.

TECHNICAL FIELD

The invention relates to optical computing methods and systems for inspecting in through light a glass container by using a digital camera, in particular with a view to computationally detecting the presence, in the glass constituting the container, of possible defects, in order to be able to identify a prohibitive or non-prohibitive nature of such defects.

PRIOR ART

There is a large number of optical computing methods for inspecting a glass container in order to detect defects therein, involving one or several digital cameras, in which the detection and the possible identification or classification of the defects are carried out by computer analysis of one or several digital images acquired by these cameras. Some methods acquire a digital image in reflected light on the container. Other methods, like those envisaged in the invention, work in through light, the light source being in this case in the field of view of the digital camera used.

The defects of a glass container can be classified based on their specific or preferred interaction with the inspection light. Some defects can have several interactions depending on the characteristics of the light used, its direction, the shapes and dimensions of the source, the observation conditions, etc. In other words, some defects can be detected with inspection methods of different natures. Better still, some defects can be better detected and better categorized by being detected with different inspection methods, highlighting a particular interaction of the defect with the inspection light.

Some defects have a totally or partially absorbent nature. These defects therefore appear opaque or dark when seen in transmission. That is to say, the light crossing a defect-free glass wall undergoes an absorption called normal absorption corresponding to the supposedly homogeneous tint and thickness of the glass wall. But the absorbent defects have a local anomaly with an absorption, sometimes lower (bubble or thin spot) but generally higher than the normal absorption. In the following, "absorption" will only refer to the abnormal absorption of the absorbent defects. Such defects include in particular inclusions in the glass, in particular of ceramics or of metals, and/or dirt (grease, etc.) on the glass. But such defects also include some glazes (cracks) which would be oriented in the glass so as to block the inspection light, mainly by the fact that the inspection light is then reflected in a direction which is not seen by the camera.

Some defects have a reflective nature. This is the case for usual glazes, but also for some defects in the finish surface, the chips, or the metal inclusions seen from some angles.

Some defects have a refractive nature. This nature is mainly related to the interaction with the light crossing one or two walls of the container. A wall has 2 opposite surfaces each, with a thickness of the glass material. Each surface is an air/glass or glass/air interface, therefore a diopter which refracts the light crossing it. In the absence of a defect, the surfaces of the walls are substantially parallel and the refraction does not cause visible deflection of the light rays crossing the container. A defect called refractive defect is a defect that locally causes abnormal refraction, mainly when the defect appears as slope deviations between surfaces or diopters of the wall(s). In the following, reference is therefore made to refraction defect only to designate deflections of the light by the particular refraction at the level of the defects called refractive defects. The refractive defects are the defects that are mainly detectable by the refraction anomalies they generate, in particular in a through light inspection. Typically, the surface defects (folds, rivers, etc.) or glass distribution defects (blisters, thin spots, compression ring), the trapezoids and the fins are generally classified among the refractive defects.

Some defects have a diffusing nature, in particular defects such as dirt, scratches, etc. It is noted that the diffusing nature is often combined with an absorbent or refractive nature.

Some defects have a birefringent nature. Thus, some defects are reflected by the presence of residual mechanical stresses in the material (sometimes called inner mechanical stresses). It is known that such defects can be detected, by determining the modification of the polarization state of the light after it has crossed the material of the container and crossed possible stress defects of the latter. To implement such methods, there are today polarimetric cameras.

Thus, depending on the nature of the defects wished to be detected in a given container, it may be necessary to implement different inspection methods. Even when considering inspection methods that operate in through light, it may be necessary to implement different illumination devices, which provide an inspection light having different light properties. Likewise, to analyze this light, it may be necessary to implement different digital cameras, possibly with the interposition of a polarization analyzer having polarization analysis properties adapted to the considered method.

To be capable of detecting different defects, of different natures, it may therefore be necessary to implement complex systems.

In particular methods and systems are known, in which the possible refractive defects are computationally detected from a series of several digital intensity images acquired by a camera, in which are analyzed the anomalies in the image resulting from the total or partial refraction, by the defect, of the incident light projected by the light source. The digital images used for such an analysis are therefore digital intensity images, each of the pixels of which has a value proportional to the light intensity emerging from a point on the container optically corresponding to this pixel in the optical system of the camera.

Document U.S. Pat. No. 4,606,634 describes a type of refractive defect detection which consists in modifying the "angular spectrum" of an extended source. U.S. Pat. No. 4,610,542 describes a method implementing a diffuse source with an intensity gradient such that the observed intensity is proportional to the slope of the refractive defects.

Other inspection methods adapted for the detection of refractive defects implement illumination devices which provide a light which is sometimes called "structured" light, that is to say having a generally two-dimensional emitting surface which has intensity variations.

Thus, document U.S. Pat. No. 4,487,322 describes a method in which a light source has a gray level (therefore intensity) variation (therefore gradient) in the form of a ramp. The crossing of the wall of the container deflects the light and, in the presence of a refractive defect, there is therefore a deformation of the ramp at the level of the defect.

Other documents describe methods implementing light sources also called "structured" light sources, but in which the light intensity variation varies periodically, with several variation periods when traveling through the useful inspection area which is seen by the digital camera in the background of the inspected area of the container. EP0344617 and EP1006350 describe methods that consist in observing in transmission the deformations of a pattern of scratches or shapes in a binary pattern, that is to say scratches or shapes that are either "white", of light intensity having a maximum value, or "black", of light intensity having a minimum value. Document EP2082216 describes a system for acquiring, with the same camera, a first image having a uniform emitting surface, which allows an analysis of appearance, and a second image having an emitting surface with a contrasted target pattern. These methods implementing binary periodic targets pose the problem that, as a function of the position of a defect in the container relative to the pattern of the target which is in the background (seen from the acquisition camera), the defect is more or less well detected. Particularly, the refractive defects located in the vicinity of a transition between two contracted shapes or scratches are poorly detected. This defect is partly resolved by the method of document EP2558847 in which two images are made with 2 targets of different colors, in phase opposition, and with a duty cycle different from 1, such that any refractive defect is contrasted and remote from any target transition in at least one of the two images.

Documents FR2794241 and FR2794242 describe a method implementing a light source which has an intensity with cyclic continuous variation in the space between the extremes of the dark and light. In this case, the variation increases the contrast of the refractive defects, but nevertheless the target itself is not detected. This method only detects the strong refractive defects.

Documents EP3552001 and EP3679356 propose using a light source composed of areas emitting different colors and capturing color images. The refractive defects appear in the image as "artifacts" not having the same color as their neighborhood. The refraction of the refractive defects is revealed by the color while the absorption of the absorbent defects remains revealed by the intensity drops. The drawback of this method is that it does not apply when the glass is tinted and blocks the transmission of some colors. In addition, as in the previous documents, the position of the defects relative to the background color transitions modifies the detection sensitivity.

Documents EP1980843 and FR2958040 each describe a reflection inspection method, called deflectometry and implementing a lighting which shows, in the background of the object to be inspected, a light pattern with an intensity variation that varies according to a law of sinusoidal variation. The method provides for collecting N images of the object by offsetting the pattern by $\pi/N$ each time, and from the N images thus collected, for calculating at each lighted point its phase which represents the position (modulo $\pi$) in the sinusoid of the source point that lights it. By assigning a phase value to each point of the lighted object, if the calculated phase value is offset from the one that would be expected in the absence of a defect, it is because a defect is deflecting the light. A similar principle of deflectometry, this time in reflection, applicable for opaque objects, is described in document "*Another way of "seeing" the surface defects*", Marie-Line Zani, MESURES 733—March 2001. The method of document EP1980843 consists in producing a phase image of the lenses and comparing it with reference phase images.

Document EP2875339 shows a transmission deflectometry method for traveling bottles. It is noted that the travel of the objects to be inspected poses, when several images must be acquired, the problem of the need to be able to superimpose the images pixel by pixel. Indeed, in addition to the simple movement due to the travel, which can generally be known, vibration phenomena which cannot be known directly cannot be excluded. In the absence of a perfectly superimposable nature of the images, detection inaccuracies are introduced.

Document WO2020/212014 describes a transmission inspection device for inspecting the side walls of containers transported by a conveyor. The device comprises a lighting device with a light source and a downstream polarizer, and comprises a polarimetric camera or a system of 4 cameras each having a polarization analyzer with an axis of polarization oriented in 4 directions, to simultaneously detect at least four different linear polarization directions.

Document WO2020/244815 describes a method for the optical inspection of containers, in which the containers are transported to an inspection unit with a lighting unit and with a camera, in which the lighting unit emits light from a light emitting surface which is locally encoded based on a polarization property, an intensity property and/or a phase property. By "polarization property" it is understood in WO2020/244815 that the light which is emitted from the different emission points of the emission surface is emitted with different polarization directions in each case. By "polarization property", it is also understood in WO2020/244815 a linear, elliptical and/or circular polarization property. For example, a polarization filter with a continuously changing polarization curve or several polarization filters with different orientations can be disposed in the area of the light emitting surface. The document indicates that the camera can comprise a Sony IMX250MZR type sensor.

One object of the invention is to propose methods and systems for detecting refractive defects at all points of an inspected area with homogeneous sensitivity over the entire inspected area, and with high sensitivity.

DISCLOSURE OF THE INVENTION

The invention therefore proposes an optical computing method for inspecting in through light a glass container moving along a movement trajectory, in which:

- the method includes the illumination of the container by an illumination device comprising at least one two-dimensional emitting surface which is arranged on one side of the movement trajectory and which is made up of elementary emitting areas each emitting a polarized emitted light with an emitted polarization property of interest which varies according to a law of periodic variation as a function of the position of the elementary emitting area in the emitting surface;
- the method includes the observation of the container, by at least one digital camera having a two-dimensional photoelectric sensor comprising photoelectric elements which each comprise a photoelectric cell corresponding to a pixel in an image acquired by the digital camera, the at least one digital camera being located, with respect to the movement trajectory, on the side opposite to that of the illumination device, so as to collect, by the at least one digital camera, an emergent light emanating from the container and having crossed at least one wall thickness of the container;

the method includes the acquisition, with the at least one camera, of partial digital images, each containing an image of the same inspected area of the container, each partial digital image having N partial pixels each of which is the image of a corresponding elementary area of the container, and each partial digital image being acquired with the interposition, between the container and the photoelectric cells of the at least one camera, of a linear analyzer having a given axis of polarization for a partial digital image;

the acquisition includes the acquisition of at least one series comprising at least a first partial digital image and a second partial digital image, for which the axes of polarization of the linear analyzers are distinct from each other, the partial digital images of the same series being superimposable such that each elementary area of the inspected area of the container is imaged by a corresponding partial pixel in each of the partial digital images of the series;

for a primary series, the partial digital images of the primary series each contain, in the background, the image of the same primary inspection portion of the emitting surface, the primary inspection portion being observed through the container by the digital camera and, on the primary inspection portion of the emitting surface, the law of periodic variation of the emitted polarization property of interest having, along a primary direction, a primary periodic variation, and having several primary periods over the extent of the primary inspection portion along the primary direction.

The method is characterized in that, over a primary period, the emitted polarization property of interest of the lights emitted by the elementary emitting areas of the primary inspection portion of the emitting surface follows a triangular variation as a function of the position of the elementary emitting area along the primary direction), and in that the method includes the computer calculation of at least one primary raw refraction image, from the partial digital images of the primary series, by calculating, for each of the elementary areas of an inspected area of the container, a primary raw refraction pixel whose value is representative of the refraction undergone by the light having crossed at least one wall thickness of the container and emerging from the elementary area, from the value of the corresponding partial pixels which are the image of the elementary area in the partial digital images of the primary series. In other words, a primary raw refraction pixel is a function of the refraction of the defects, and measures the refraction of the defects.

Other optional characteristics of such a method, taken alone or in combination, are described below.

In some cases, for the same inspected area of the same container, the method includes the acquisition, for the primary series, of a third partial digital image and a fourth partial digital image for which the axes of polarization of the linear analyzers are distinct from each other and distinct from the axes of polarization of the linear analyzers for the first partial digital image and the second partial digital image of the primary series, preferably orthogonal to each other and shifted by 45 angle degrees from the axes of polarization of the linear analyzers for the first partial digital image and the second partial digital image of the primary series.

In some cases:

for the same inspected area of the same container, the acquisition includes the acquisition of at least one secondary series of partial digital images;

for the secondary series, the partial digital images each contain, in the background, the image of the same secondary inspection portion of the emitting surface, the secondary inspection portion being observed through the container by the digital camera, and, on the secondary inspection portion of the emitting surface, the law of periodic variation of the emitted polarization property of interest having, along a secondary direction of the emitting surface, different from the primary direction, a secondary periodic variation, and having several secondary periods over the extent of the secondary inspection portion along the secondary direction;

over a secondary period, the emitted polarization property of interest of the lights emitted by the elementary emitting areas of the secondary inspection portion of the emitting surface follows a triangular variation as a function of the position of the elementary emitting area along the secondary direction;

and, the method includes the computer calculation of at least one secondary raw refraction image, from the partial digital images of the secondary series, by calculating, for each of the elementary areas of an inspected area of the container, a secondary raw refraction pixel whose value is representative of the refraction undergone by the light having crossed at least one wall thickness of the container and emerging from the elementary area, from the value of the corresponding partial pixels which are the image of the elementary area in the partial digital images of the secondary series.

In some cases, the partial digital images of the same series are acquired at the same moment.

In some cases, the method comprises the calculation, from at least two partial digital images, of an intensity image It in which the value of each intensity pixel is calculated as an averaged value of the value of at least two partial pixels corresponding to the same elementary area.

In some cases, the method comprises the acquisition of at least one complementary master image so as to calculate a stress image of the inspected area and/or an intensity image for the inspected area.

In some cases, a stress image is obtained, by computationally calculating, for the elementary areas of the inspected area of the container, a phase shift pixel corresponding to each elementary area of the inspected area of the container and whose value is representative of an induced polarization phase shift, by a residual mechanical stress located in the elementary area of the container corresponding to a composite pixel, in the emergent light emanating from this elementary area of the container.

In some cases:

the at least one digital camera is a polarimetric digital camera, having a two-dimensional photoelectric sensor comprising photoelectric elements which each comprise a photoelectric cell in front of which is arranged an individual linear analyzer associated with the photoelectric cell of this photoelectric element, the photoelectric sensor including a number N of distinct groups of 4 contiguous photoelectric elements whose individual linear analyzers each have an axis of polarization, the four axes of polarization of a given group of 4 photoelectric elements forming two pairs of orthogonal axes of polarization, the two pairs being offset from each other by 45 angle degrees;

and the acquisition of the 4 partial digital images of the same series is performed, with the photoelectric sensor of the polarimetric camera, by the acquisition of a master digital image containing an image of the container, the master digital image having a number 4*N of master pixels grouped into N composite pixels each corresponding to a group of contiguous photoelectric elements, each composite pixel having 4 master pixels each corresponding to one of the elements of the group of contiguous photoelectric elements corresponding to this composite pixel, and each master digital image comprising the 4 distinct partial digital images each having N partial pixels, the partial pixels of each of the partial digital images corresponding, for a given partial digital image, to the photoelectric elements of the photoelectric sensor whose individual linear analyzers have a common axis of polarization for this partial digital image.

In some cases, for the same inspected area of the same container, the primary series of partial digital images and the secondary series of partial digital images are acquired at different moments.

In some cases, for the same inspected area of the same container, the primary series of partial digital images and the secondary series of partial digital images are acquired with the same at least one digital camera.

In some cases, the primary inspection portion and the secondary inspection portion correspond to two different polarization states, at different moments, of the same inspection portion of the emitting surface.

In some cases:

the triangular variation is such that each primary period is divided into only two parts, an increasing part and a decreasing part, in the increasing part, the emitted polarization property of interest is an increasing linear function of the position of the elementary emitting area along the primary direction, the emitted polarization property of interest increasing from a primary lower value to a primary upper value, and, in the decreasing part, the emitted polarization property of interest is a decreasing linear function of the position of the elementary emitting area along the primary direction, the emitted polarization property of interest decreasing from the primary upper value to the primary lower value.

In some cases, the increasing part and the decreasing part of each primary period are of equal extent along the primary direction.

In some cases, the inspection portion of the emitting surface is made up of elementary emitting areas each emitting an elliptically polarized emitted light with an ellipticity ratio less than or equal to 0.7, and the emitted polarization property of interest of the light emitted by an elementary emitting area is the orientation of the main axis of polarization of the light emitted by said elementary emitting area.

In some cases, the lower, respectively higher, value of the emitted polarization property of interest is a lower angular value over a period, respectively higher angular value over a period, of the orientation of the main axis of polarization of the light emitted by the elementary emitting areas, the angular deviation between the upper angular value and the lower angular value being of at least 45 angle degrees, preferably at least 70 angle degrees.

In some cases, the primary inspection portion of the emitting surface is made up of elementary emitting areas each emitting a polarized emitted light according to an elliptical polarization with a phase shift between the two orthogonal components of the electric field vector of the polarized emitted light, and the emitted polarization property of interest corresponds to the phase shift between the two orthogonal components of the electric field vector of the polarized emitted light.

In some cases, the primary period is seen by the two-dimensional photoelectric sensor with a resolution, along the primary direction, of at least 15 partial pixels of the same partial digital image per primary period.

In some cases, the inspected area of the container is seen by the two-dimensional photoelectric sensor with a resolution, along the primary direction, of at least 5 partial pixels of the same partial digital image per millimeter on the container.

In some cases, the value of a raw refraction pixel is calculated, for an elementary area of the container, from the arc-tangent of a ratio between the values of two corresponding partial pixels in the first partial image and the second partial image.

In some cases, the value of a raw refraction pixel is calculated, for an elementary area of the container, from the arc-tangent of a ratio between, on the one hand, the difference in value of two corresponding partial pixels in the first partial image and the second partial image and, on the other hand, the difference in value of the two corresponding partial pixels in the third partial image and the fourth partial image.

In some cases, the illumination device includes, in the direction of propagation of the light, a primary two-dimensional source of diffuse light, an upstream linear polarizer having an axis of polarization, and a two-dimensional matrix of liquid crystal cells.

In some cases, the method includes the control of the two-dimensional matrix of liquid crystal cells such that the polarized light derived from each of the liquid crystal cells has an elliptical polarization with, for each liquid crystal cell, the orientation of the main axis of polarization and/or a phase shift between the two orthogonal components of the electric field vector of the light derived from the liquid crystal cell, and, for the acquisition of the primary series of partial digital images, the at least one among the orientation of the main axis of polarization and/or the phase shift follows a triangular variation as a function of the position of the liquid crystal cell along the primary direction.

In some cases, the method includes the control of the two-dimensional matrix of liquid crystal cells such that, for the acquisition of the secondary series of partial digital images, the at least one among the orientation of the main axis of polarization and/or the phase shift follows a triangular variation as a function of the position of the liquid crystal cell along the secondary direction.

In some cases, the method includes the control of the two-dimensional matrix of liquid crystal cells such that, successively, for the acquisition of the primary series of partial digital images of a given container, the at least one among the orientation of the main axis of polarization and/or the phase shift follows a triangular variation as a function of the position of the liquid crystal cell along the primary direction, then such that, for the acquisition of the secondary series of partial digital images, the at least one among the orientation of the main axis of polarization and/or the phase shift follows a triangular variation as a function of the position of the liquid crystal cell along the secondary direction.

In some cases, the method includes a prior step of calibrating the control of the two-dimensional matrix of liquid crystal cells.

In some cases, the method includes a step of analyzing refraction anomalies comprising a step of computer calculation based on the raw refraction image.

In some cases, the refraction anomaly analysis step includes a step of detecting a gradient in the primary raw refraction image along the primary direction.

The invention also proposes an optical computing system for inspecting in through light, by using at least one digital camera, a glass container moving along a movement trajectory, in which:

the system includes an illumination device comprising at least one two-dimensional emitting surface, arranged on one side of the movement trajectory and which is made up of elementary emitting areas each emitting a polarized emitted light with a polarization property;

the system includes at least one digital camera with a two-dimensional photoelectric sensor comprising photoelectric elements which each comprise a photoelectric cell, the at least one digital camera being located, with respect to the movement trajectory, on the side opposite to that of the illumination device, so as to collect, by the at least one digital camera, an emergent light emanating from the container and having crossed at least one wall thickness of the container;

the system is configured to acquire, with the at least one digital camera, at least one series including two partial digital images, each containing an image of the same inspected area of the container, each partial digital image having N partial pixels each of which is the image of a corresponding elementary area of the container, and each partial digital image being acquired with interposition, between the container and the photoelectric cells of the at least one digital camera, of a linear analyzer with a given axis of polarization for a partial digital image, the axes of polarization of the linear analyzers for the at least two partial digital images being distinct from each other, the partial digital images of the same series being superimposable such that each elementary area of the inspected area of the container is imaged by a corresponding partial pixel in each of the partial digital images of the series.

The system is characterized in that the illumination device includes, in the direction of propagation of the light, a primary two-dimensional source of diffuse light, an upstream linear polarizer having an axis of polarization, and a two-dimensional matrix of liquid crystal cells.

Other optional characteristics of such a system, taken alone or in combination, are described below.

In some cases, the system includes means for controlling the two-dimensional matrix of liquid crystal cells such that the polarized light derived from each of the liquid crystal cells has an elliptical polarization with, for each liquid crystal cell, an orientation of the main axis of polarization and/or a phase shift between the two orthogonal components of the electric field vector of the light derived from the liquid crystal cell, and the illumination device is controlled such that the at least one among the orientation of the main axis of polarization and/or the phase shift follows a variation as a function of the position of the liquid crystal cell along a primary direction of the emitting surface.

In some cases, the illumination device is controlled such that the at least one among the orientation of the main axis of polarization and/or the phase shift follows a triangular variation as a function of the position of the liquid crystal cell along a primary direction of the emitting surface.

In some cases, the system includes, in the light path between the two-dimensional matrix of liquid crystal cells and the linear analyzers for the at least two partial digital images, a quarter-wave retarder plate which has a fast axis oriented parallel or perpendicular to the axis of polarization of the upstream linear polarizer.

In some cases, the quarter-wave retarder plate is arranged in the light path between the two-dimensional matrix of liquid crystal cells and the container.

In some cases, the quarter-wave retarder plate is arranged in the light path between the container and the linear analyzers for the at least two partial digital images.

In some cases, the system includes a computer calculation unit programmed to perform the computer calculation of at least one primary raw refraction image, from the partial digital images, by calculating, for each of the elementary areas of an inspected area of the container, a refraction pixel whose value is representative of the refraction undergone by the light having crossed at least one wall thickness of the container and emerging from the elementary area, from the value of the corresponding partial pixels which are the image of the elementary area in the partial digital images.

In some cases, the digital camera is a polarimetric digital camera.

In some cases, the control of the two-dimensional matrix of liquid crystal cells is synchronized with the acquisition, with the at least one camera, of the at least two partial digital images so as to:

acquire a primary series of at least two partial digital images when the two-dimensional matrix of liquid crystal cells is controlled such that the at least one among the orientation of the main axis of polarization and the phase shift follows a triangular variation as a function of the position of the liquid crystal cell along the primary direction;

acquire a secondary series of at least two partial digital images when the two-dimensional matrix of liquid crystal cells is controlled such that the at least one among the orientation of the main axis of polarization and the phase shift follows a triangular variation as a function of the position of the liquid crystal cell along a secondary direction different from the primary direction.

In some cases, the axes of polarization of the linear analyzers for the at least two partial digital images are orthogonal to each other.

BRIEF DESCRIPTION OF THE DRAWINGS

FIG. 1 is a schematic perspective view illustrating a first type of optical computing system for inspecting in through light a glass container.

FIG. 2 is a schematic perspective view illustrating a second type of optical computing system for inspecting in through light a glass container.

FIG. 3 is a schematic perspective view illustrating a third type of optical computing system for inspecting in through light a glass container.

FIG. 4 is a schematic top view illustrating another embodiment of an optical computing system for inspecting in through light a glass container, comprising two digital cameras.

FIG. 5 is a schematic side view illustrating yet another embodiment of an optical computing system for inspecting in through light a glass container, optimized more particularly for inspecting a bottom wall of the container.

FIG. 6 is a diagram illustrating one example of a triangular periodic function.

FIG. 7 is a schematic perspective view illustrating a principle of a sensor for a polarimetric digital camera.

FIG. 8 is a diagram illustrating an arrangement of linear polarization analyzers for a sensor for a polarimetric digital camera.

FIG. 9 illustrates a master image acquired by a polarimetric digital camera, comprising several partial images.

FIG. 10 illustrates a flowchart for an optical computing method for inspecting in through light a glass container.

FIG. 11 is a diagram illustrating the principle of dimensioning some parameters of a system for an optical computing method for inspecting in through light a glass container along a primary direction.

FIG. 12 is a diagram illustrating the principle of dimensioning some parameters of a system for an optical computing method for inspecting in through light a glass container along a secondary direction.

DESCRIPTION OF THE EMBODIMENTS

FIGS. 1 to 5 illustrate different optical systems 10 for inspecting in through light defects in a container 12 made of colored or uncolored transparent glass, for example, a glass bottle or a glass jar.

In each case, the system 10 is designed and able to implement an optical computing method for inspecting in through light a glass container by using at least one digital camera 12. In some embodiments, such as those illustrated in FIGS. 1 to 3 or in FIG. 5, the system 10 could include a single camera 18, which in this case will be advantageously a single polarimetric digital camera 18 as described in more detail below. In some modes of these embodiments, such as the one illustrated in FIG. 4, the system 10 will include a set of several digital cameras, for example two digital cameras 18.1, 18.2, the two digital cameras 18.1, 18.2 then being able to be conventional monochrome or color digital cameras. In all cases, the digital camera(s) 18, 18.1, 18.2 each include a two-dimensional photoelectric sensor 22 having a two-dimensional array of photoelectric elements which each comprise a photoelectric cell. The digital camera(s) 18, 18.1, 18.2 each make it possible to acquire at least one digital image of at least one area of the container at the time of its passage in the inspection location 13 of the system 10, the digital image thus acquired being used in the inspection method described below.

More particularly, the system 10 is designed and able to implement such a method in an industrial line for the production of glass containers and/or in an industrial line for the automated transport of the glass containers, and/or in an automated industrial line for the filling of the glass containers. In such lines, containers are transported, for example by a conveyor 14 of the line, along a movement trajectory T, along at least one line of successive containers along the trajectory. The rate of travel of the containers in such a line can for example be comprised between 150 and 1,200 containers per minute.

The system 10 is designed and able to be installed at a given station along such a line, so as to implement the optical computing method for inspecting in through light successively for each container 12 the line of containers, at the time of passage of the container 12 in the inspection location 13 of the system 10, location at which a container 12 must be placed in order to be inspected by the system 10.

At the level of the inspection location 13 of the system 10, the circulation trajectory of the containers 12 can be a rectilinear trajectory, or a curvilinear trajectory. The inspection location 13 can be represented by a vertical axis A13 fixed relative to the system 10. For example, it can be considered that the container 12 is placed at the inspection location 13 when a main axis A12 of the container 12, for example an axis of symmetry of the container, or for example an axis of symmetry of revolution of the container, coincides with the fixed vertical axis A13 corresponding to the inspection location 13. In the examples illustrated in FIGS. 1 to 4, the system 10 is particularly designed to inspect the side wall of the container 12. As illustrated in FIG. 5, it can be provided that the system 10 is designed to inspect other parts of the container 12, for example the bottom wall of the container 12.

The system 10 comprises an illumination device 16 delivering, on the container 12, when the latter is at the inspection location 13 of the system 10, an incident light. In other words, the illumination device 16 delivers the incident light to the inspection location 13 of the system 10.

Regarding a through light inspection system, the illumination device 16 includes a primary light source 16a which is arranged in the field of view of the digital camera(s) 18, 18.1, 18.2. Thus, at the time of its passage to the inspection location 13 of the system 10, the container 12 to be inspected is arranged, on the path of the incident light delivered by the illumination device 16, between the illumination device 16 and the digital camera(s) 18, 18.1, 18.2. In other words, the inspection location 13 of the system 10 is arranged between the illumination device 16 and the digital camera(s) 18, 18.1, 18.2 on the path of the incident light delivered by the illumination device 16. Thus, the at least one digital camera 18, 18.1, 18.2 is located, with respect to the movement trajectory T, on the side opposite to that of the illumination device 16, so as to collect, by the at least one digital camera 18, 18.1, 18.2, an emergent light emanating from the container 12. To do so, the digital camera(s) 18, 18.1, 18.2 collect the incident light emitted by the illumination device, after it has crossed the inspected area of the container. The light collected by the digital camera(s) 18, 18.1, 18.2 has therefore interacted with at least one wall thickness of the container, often with two wall thicknesses of the container 12. In this interaction with the container, the light collected by the digital camera(s) 18, 18.1, 18.2 may have undergone, in relation to the light emitted by the illumination device, at least the refraction that the systems and methods described below will seek to inspect.

FIGS. 1 to 4 illustrate systems 10 which are arranged to allow an inspection of a side wall of a container such as a glass bottle 12. The conveyor 14 is then for example a belt conveyor, on which the bottle 12 is laid by its bottom. In such systems, the light collected by the digital camera(s) 18, 18.1, 18.2 coming from the inspected area of the container has therefore interacted with two wall thicknesses of the container 12.

FIG. 5 illustrates a system 10 which is arranged to allow an inspection of the bottom of a container 12 such as a glass bottle. The conveyor 14 is then for example a band conveyor comprising two opposite side bands which each rest on the two opposite sides of the side wall of the bottle to hold it. The illumination device 16 is arranged on the side of the bottom of the bottle 12, perpendicular to the axis A12 of the bottle. The digital camera 18 is arranged on the other side of the bottle, oriented along the axis A12 thereof so as to look at the bottom wall of the bottle through the upper opening of the bottle, so as to inspect it transparently. In such a system, the light collected by the digital camera(s) 18, 18.1, 18.2 coming from the inspected area of the container has therefore interacted with a single wall thickness of the container 12.

As will be understood from the following, the illumination device 16 comprises at least one two-dimensional emitting surface 16s, which is arranged on one side of the movement trajectory T and which is turned towards the inspection location 13. The emitting surface 16s is made up of elementary emitting areas each emitting a polarized emitted light. As will be seen below, the illumination device 16 can be configured such that, for the acquisition of digital images intended to be used in the method, the light emitted by each of the elementary emitting areas has an emitted polarization property of interest which varies according to a law of periodic variation as a function of the position of the elementary emitting area in the emitting surface. The incident light delivered by the illumination device 16 is therefore a polarized light.

In the examples illustrated, the illumination device 16 includes, in the direction of propagation of the light, a primary two-dimensional source 16a of diffuse light, an upstream linear polarizer 16b having an axis of polarization A0, and a two-dimensional matrix 16c of liquid crystal cells 16c(i,j). The two-dimensional matrix 16c is a controlled matrix in the sense that each liquid crystal cell 16c(i,j) can be controlled such that, for a given polarized light to the entrance of the cell, at least one polarization property of the light exiting from the cell can be modified in a variable manner depending on a control setpoint applied to the liquid crystal cell 16c(i,j).

In some embodiments, in particular those of FIGS. 1, 3, 4, and 5, the emitting surface 16s of the illumination device 16 is constituted by the surface of the two-dimensional matrix 16c of liquid crystal cells which is turned towards the inspection location 13.

On the other hand, in some embodiments, such as the one illustrated in FIG. 2, the illumination device 16 includes, in addition, a quarter-wave retarder plate 16d which has a fast axis oriented parallel or perpendicular to the axis of polarization A0 of the upstream linear polarizer 16b. In the example of FIG. 2, the quarter-wave retarder plate 16d forms part of the illumination device 16 and is arranged in the light path between the two-dimensional matrix 16c of liquid crystal cells and the inspection location 13, therefore between the two-dimensional matrix 16c of liquid crystal cells and the container 12 when the container 12 is at the inspection location 13. In such a case, the emitting surface 16s of the illumination device 16 is constituted by the surface of the quarter-wave retarder plate 16d which is turned towards the inspection location 13. It will be noted that when, as in the example of FIG. 2, the quarter-wave retarder plate 16d forms part of the illumination device 16, the quarter-wave retarder plate 16d can be directly adjoined to the two-dimensional matrix 16c of liquid crystal cells, even if it means forming a single component with the two-dimensional matrix 16c.

In both cases, elementary emitting areas of the emitting surface 16s can therefore be determined. In the first case, each elementary emitting area of the emitting surface 16s is a liquid crystal cell 16c(i,j) of the two-dimensional matrix 16c of liquid crystal cells, or possibly a predefined group of cells. In the second case, each elementary emitting area of the emitting surface 16s is an elementary area of the quarter-wave retarder plate 16d whose background, when seen from the digital camera, is a liquid crystal cell 16c(i,j) of the two-dimensional matrix 16c of liquid crystal cells, or possibly a predefined group of cells.

Generally, the emitting surface 16s is the surface of the illumination device 16 which emits the incident light in the direction of the inspection location 13, and each elementary emitting area of the emitting surface 16s is an area which has, at any moment, seen from the digital camera 18, 18.1, 18.2, an identical value of the polarization property of interest emitted over the entire elementary emitting area.

Optionally, a transparent glass protective window can be placed in front of the emitting surface 16s, without modifying the polarization properties of the light emitted by the illumination device 16. Likewise, a spectral filter and/or colored filter can be positioned on the path of the light without modifying the polarization property of interest of the light emitted by the illumination device 16. The system operates in the same way with or without the protective window and with or without a spectral filter or colored filter.

Preferably, the emitting surface 16s is planar and perpendicular to the optical axis of the digital camera 18, 18.1, 18.2.

Preferably, the primary light source 16a is an extended light source. For example, the dimensions of the lighting surface of the primary light source 16a, perpendicular to an axis of incidence going from the light source 16a to the inspection location 13, are greater than the corresponding dimensions of the area to be inspected of the container 12. For example, the light source 16a can comprise a two-dimensional array of light-emitting diodes and a diffuser. A diffuser can for example be made in the form of a translucent and/or frosted sheet. In such a case, the light-emitting diodes can optionally be controlled individually, or can be controlled only in groups, or can be controlled only globally, that is to say with a single control over the entire extent of the lighting surface of the primary light source 16a. In general, the primary light source 16a, in particular its possible light-emitting diodes, can be controlled according to at least one or several parameters among the light intensity, the moment of ignition, the moment of extinction, etc. . . . . The Light-emitting diodes are optionally composed of "multi-die" diodes of different colors, chosen according to the tint of the glass, and controlled to deliver variable monochromatic or polychromatic emission spectra.

Preferably, the incident light has an energy spectrum comprised in a wavelength band itself comprised between 250 nm and 1,000 nm, the wavelength band having a width smaller than 150 nm, preferably smaller than 100 nm. Therefore, preferably, the primary light source 16a delivers a light having such an energy spectrum, even if it includes one or several filters. With such an energy spectrum, of small width, the incident light, and therefore preferably the light delivered by the primary light source 16a is close to monochromatic light. Moreover, if a quarter-wave retarder plate is used, which is generally only adapted to a precise wavelength or to a small-width wavelength band around this precise wavelength, the induced delay is exactly a quarter of the wavelength only for the precise wavelength value or for a small-width wavelength band around this precise wavelength. In some embodiments, the energy spectrum of the incident light has an energy spectrum that will be adjustable, for example by adjusting the primary light source 16a or by implementing one or several filters in the illumination device.

It has been seen that the illumination device 16 can be configured such that the elementary emitting areas each emit a polarized emitted light with an emitted polarization property of interest that varies according to a law of periodic variation as a function of the position of the elementary emitting area in the emitting surface. In the illustrated embodiments, this law of variation of the emitted polarization property of interest is obtained by an appropriate control of the two-dimensional matrix $16c$ of liquid crystal cells.

Such a two-dimensional matrix $16c$ of liquid crystal cells is a known component in the field of liquid crystal displays. Generally, such a two-dimensional matrix $16c$ of liquid crystal cells includes two parallel glass sheets between which there is a material of the liquid crystal type. The two inner faces of the glass sheets each include an matrix of electrodes, each pair of opposite electrodes determining a liquid crystal cell $16c(i,j)$. Each pair of electrodes can be controlled by a control setpoint, for example a voltage setpoint, to generate, in the liquid crystal cell $16c(i,j)$ which is determined by the pair of electrodes, an electric field which acts on the orientation of the liquid crystals in the cell. Depending on their orientation in the cell, which is therefore determined in the cell by the voltage control between the two electrodes of this cell, the action of the liquid crystals on the polarization of the light which crosses the liquid crystal cell $16c(i,j)$ varies. Thus, by varying the voltage between the two electrodes associated with the liquid crystal cell $16c(i,j)$, the action of the liquid crystals of the cell on the polarization of the light which crosses each liquid crystal cell $16c(i,j)$ is varied.

It is recalled that, in the examples illustrated, it is planned to dispose in the path of the light, upstream of the two-dimensional matrix $16c$ of liquid crystal cells, the upstream linear polarizer $16b$, so that the light which enters into each liquid crystal cell $16c(i,j)$ is a linearly polarized light along an axis of polarization which is defined by the upstream linear polarizer $16b$, and of which the two orthogonal components of the electric field vector are without initial phase shift.

The action of the liquid crystals of the cell on the polarization of the light which crosses the liquid crystal cell $16c(i,j)$ will in particular transform this incoming light into output light which will be:

in the case of some two-dimensional matrix technologies of liquid crystal cells, a linearly polarized light having an axis of polarization that will have undergone an angular offset, i.e. the result of a rotation, of the orientation $\theta c(i,j)$ of the axis of polarization with respect to the axis of polarization A0 defined by the upstream linear polarizer $16b$, the orientation $\theta c(i,j)$ of the axis of polarization with respect to the axis of polarization A0 defined by the upstream linear polarizer $16b$ then being variable as a function of the voltage control between the two electrodes associated with the liquid crystal cell $16c(i,j)$;

more generally in the case of other technologies of two-dimensional matrix of liquid crystal cells, an elliptically polarized light, this polarization being able to be characterized on the one hand by an orientation $\theta c(i,j)$ of a main axis of the polarization ellipse hereinafter main axis of polarization, and on the other hand by a phase shift $\varphi 16c(i,j)$ between the two orthogonal components of the electric field vector of the light that crosses it, the phase shift $\varphi 16c(i,j)$ then being variable as a function of the voltage control between the two electrodes associated with the liquid crystal cell $16c(i,j)$.

In reality, most technologies will be situated in the general case in which the action of the liquid crystals of the cell on the polarization of the light transforms this incoming light into an elliptically polarized output light, characterized by both an orientation $\theta c(i,j)$ of the main axis of the polarization ellipse having an angular offset with respect to the axis of polarization defined by the upstream linear polarizer $16b$ that will vary as a function of the voltage control between the two electrodes associated with the liquid crystal cell $16c(i,j)$, and on the other hand by a phase shift $\varphi 16c(i,j)$ that will also vary as a function of the voltage control between the two electrodes associated with the liquid crystal cell $16c(i,j)$. However, some technologies will rather generate, as a function of the voltage control between the two electrodes associated with the liquid crystal cell $16c(i,j)$, a comparatively greater variation in the angular offset of the orientation $\theta c(i,j)$ of the main axis of the polarization ellipse and on the contrary, in comparison, a comparatively lower variation, even low enough to be negligible, in the phase shift $\varphi 16c(i,j)$. It appeared that this is for example the case of the TN (Twisted Nematics) technology. Conversely, still as a function of the voltage control between the two electrodes associated with the liquid crystal cell $16c(i,j)$, other technologies will rather generate a comparatively greater variation in the phase shift $\varphi 16c(i,j)$ and, in comparison, a comparatively lower variation, even low enough to be negligible, in the angular offset of the orientation $\theta c(i,j)$ of the main axis of the polarization ellipse. It appeared that this is for example the case of ECB (Electrically Controlled Birefringence) technology.

It is recalled that, in a polarized light, the two vector, preferably orthogonal, components of the electric field of the light at a given point, at a given moment, entirely define the orientation of the electric field at this given point and at this given moment. The figure described, over time by the electric field at a given point is then:

for a linear polarization, a straight line segment which defines the orientation of the linear axis of polarization;

for an elliptical polarization, an ellipse in which a major axis of the ellipse, which will hereinafter be called main axis of the ellipse or main axis of polarization, and a minor axis, can be defined;

for a circular polarization, a circle.

For an elliptically polarized light, the ellipticity ratio, or abbreviated "ellipticity", can be defined as the ratio between the minor axis of the polarization ellipse and the major axis of the polarization ellipse, the latter being the main axis of polarization.

In the present text, it will be considered that a linearly polarized light is a particular case of elliptically polarized light, with in this particular case:

a flattened polarization ellipse reduced to a segment, for which the main axis of polarization, which is the segment formed by the flattened ellipse, is quite simply the axis of linear polarization of the linearly polarized light;

a zero phase shift between the two orthogonal components of the electric field vector of the light.

In the present text, it will be considered that a circularly polarized light is also a particular case of elliptically polarized light, with in this particular case:

a polarization ellipse which is a circle;

a phase shift between the two orthogonal components of the electric field vector of the light which is equal to 90 angle degrees.

Consequently, the notion of elliptically polarized light contains that of linearly polarized light. For a linear polarization the ellipticity ratio is 0, and for a circular polarization the ellipticity ratio is 1.

It can therefore be considered that each liquid crystal cell $16c(i,j)$ of the two-dimensional matrix $16c$ of liquid crystal cells induces, in a linearly polarized incoming light, which is here a linearly polarized light, as a function of the voltage control between the two electrodes associated with the liquid crystal cell 16c(i,j):

a variable angular offset in the orientation of the main axis of polarization, which results in a variation in the orientation θc(i,j) of the main axis of polarization of the light exiting from the liquid crystal cell 16c(i,j) as a function of the voltage control between the two electrodes associated with the liquid crystal cell 16c(i,j);

and/or a variation in a delay, or phase shift φ16c(i,j), between the two orthogonal components of the electric field vector of the light that exits from the liquid crystal cell 16c(i,j).

Thus, this orientation θc(i,j) and/or this phase shift φ16c(i,j) can be controlled by controlling the voltage between the two electrodes associated with the liquid crystal cell 16c(i,j). Thus, by controlling the voltage between the electrodes of each liquid crystal cell 16c(i,j), the two-dimensional matrix of liquid crystal cells can be configured so that the polarized light derived from each of the liquid crystal cells has an elliptical polarization with, for each liquid crystal cell 16c(i,j) at least one controlled polarization property among:

an orientation θc(i,j) controlled from the main axis of polarization;

and/or a phase shift φ16c(i,j) controlled between the two orthogonal components of the electric field vector of the light derived from the liquid crystal cell 16c(i,j).

It is noted that the disposition of a linear polarizer upstream of a two-dimensional matrix of liquid crystal cells is an inherent technique in the production of the liquid crystal displays. In this way, those skilled in the art will be able to implement, for the production of the illumination device 16, and in particular with regard to the association of the upstream linear polarizer 16b with the two-dimensional matrix 16c of liquid crystal cells, design techniques and rules that are usually implemented in the field of the liquid crystal displays. Conversely, it will be noted that, contrary to a usual construction of the liquid crystal displays, the illumination device 16 does not include a linear polarizer downstream of the two-dimensional matrix of liquid crystal cells, in particular no linear polarizer in the path of the light between the two-dimensional matrix 16c of liquid crystal cells and the inspection location 13 at which the container 12 to be inspected must be placed.

In the two-dimensional matrix 16c of liquid crystal cells, the liquid crystal cells 16c(i,j) are generally disposed in a two-dimensional array in the plane of the matrix, with a disposition in perpendicular columns (i) and rows (j). Generally, it is noted that the axis of polarization A0 of the upstream linear polarizer 16b is preferably oriented at 45° relative to the perpendicular columns and rows of liquid crystal cells 16c(i,j) of the two-dimensional matrix 16c.

Preferably, the system 10 includes means for controlling the two-dimensional matrix of liquid crystal cells, able to monitor each cell 16c(i,j) individually, therefore to individually control as many cells as the number of columns multiplied by the number of rows. In such a case, there will be a correspondence of an elementary area of the emitting surface 16s with a cell 16c(i,j) of the two-dimensional matrix of liquid crystal cells. However, in some embodiments, it could be provided that the system 10 includes control means which are not able to monitor each cell 16c(i,j) individually, but only to individually monitor groups of cells, for example rows 16c(i) of cells, columns 16c(j) of cells or sets of adjacent cells. In such a case, an elementary emitting area will correspond to one of these columns, to one of these rows, or to one of these sets of liquid crystal cells. For the remainder of the description, the case of control means which are able to individually monitor each liquid crystal cell 16c(i,j) will be considered.

In all cases, it is provided that the system is able to configure at least one portion of the two-dimensional matrix of liquid crystal cells such that the polarized light derived from each of the liquid crystal cells has an elliptical polarization with, for each liquid crystal cell 16c(i,j), an orientation θc(i,j) controlled from the main axis of polarization and/or a phase shift φ16c(i,j) controlled between the two orthogonal components of the electric field vector of the light derived from the liquid crystal cell 16c(i,j). The portion capable of being thus controlled, or the portion which is actually thus controlled, corresponds to a portion called inspection portion of the emitting surface 16s. This portion is also two-dimensional.

It therefore appeared that, as a function of the voltage control applied to the electrodes of a given liquid crystal cell 16c(i,j), it was possible, when the light crosses the liquid crystal cell, the light being linearly polarized therefore without phase shift to the entrance into the cell 16c(i,j), to induce an orientation θc(i,j) controlled from the main axis of polarization and/or a phase shift controlled between the two orthogonal components of the electric field vector of the light derived from the liquid crystal cell 16c(i,j).

In the technologies that allow it, for example the "TN" technology, the orientation θc(i,j) of the main axis of polarization can thus vary, as a function of the control applied to the electrodes, from an initial value corresponding to the case where no voltage is applied to the electrodes of the liquid crystal cell 16c(i,j), to a final value corresponding to the case where a maximum voltage is applied to the electrodes of the liquid crystal cell 16c(i,j). In some of these technologies, for example "TN" technology, the initial value of the orientation θc(i,j) of the main axis of polarization is an orientation at 90° from the orientation of the axis of polarization of the incoming light, therefore at 90° from the orientation of the axis of polarization of the upstream polarizer. It appears that, depending on the characteristics of the two-dimensional matrix 16c of liquid crystal cells, the final value of the orientation θc(i,j) of the main axis of polarization of the light derived from the liquid crystal cell, corresponding to the maximum voltage applied to the electrodes of the liquid crystal cell, can reach an angular offset with respect to the initial value which is of at least 30 angle degrees, preferably at least 45 angle degrees, more preferably 70 angle degrees.

In the technologies that allow it, for example "ECB" technology, the phase shift φ16c(i,j) can thus vary, depending on the control applied to the electrodes, from an initial value, in some cases a zero value, corresponding to the case where no voltage is applied to the electrodes of the liquid crystal cell 16c(i,j), to a final value, in some cases a maximum value, corresponding to the case where a maximum voltage is applied to the electrodes of the liquid crystal cell 16c(i,j). It appears that, according to the characteristics of the two-dimensional matrix 16c of liquid crystal cells, the difference between the initial and final phase shift values between the two orthogonal components of the electric field vector of the light derived from the liquid crystal cell, corresponding to the maximum voltage applied to the electrodes of the liquid crystal cell, can reach a value in the range from 45 to 90 angle degrees. At least some of the two-dimensional matrices of liquid crystal cells of "ECB" technology have such behavior.

It is noted that the correlation between on the one hand the voltage applied to the electrodes of the liquid crystal cell $16c(i,j)$ and on the other hand the orientation value $\theta c(i,j)$ of the main axis of polarization and/or the phase shift $\varphi 16c(i,j)$ can be a positive correlation if the two vary in the same direction, or a negative correlation if the two vary in opposite directions.

Likewise, it appeared that, in both cases, the variation in the orientation $\theta c(i,j)$ of the main axis of polarization and/or in the phase shift $\varphi 16c(i,j)$ induced in a light, initially linearly polarized and crossing the liquid crystal cell $16c(i,j)$, is a continuous function of the voltage applied to the electrodes of this liquid crystal cell $16c(i,j)$. On the other hand, it also appeared that the variation in the orientation $\theta c(i,j)$ of the main axis of polarization and/or in the phase shift $\varphi 16c(i,j)$ induced in a light, initially linearly polarized and crossing the liquid crystal cell $16c(i,j)$, is not necessarily a linear or affine function of the voltage applied to the electrodes of the liquid crystal cell $16c(i,j)$. However, it is possible, at least by a prior calibration procedure, to establish a conversion function making it possible to know the value of the orientation $\theta c(i,j)$ of the main axis of polarization and/or of the phase shift $\varphi 16c(i,j)$ induced as a function of the voltage applied to the electrodes of the liquid crystal cell $16c(i,j)$. In other words, it is possible, at least by a prior calibration procedure, to determine what voltage value must be applied to the electrodes of the liquid crystal cell $16c(i,j)$ in order to obtain an orientation $\theta c(i,j)$ of the main axis of polarization and/or a desired induced phase shift $\varphi 16c(i,j)$ of a light initially linearly polarized and crossing the liquid crystal cell $16c(i,j)$. An example of a calibration method will be given later.

The system 10 comprises control means 100, an example of which is illustrated symbolically in FIG. 1 and FIG. 4. These control means 100 can comprise at least one computer calculation unit, for example a standard computer 110. They may comprise one or several electronic interface unit(s) 120 for the digital camera(s) 18, 18.1, 18.2, at least part of which can be integrated into the digital camera(s). The control means 100 can comprise an electronic control unit 130 for driving the illumination device 16, in particular for driving the primary light source 16a and/or the two-dimensional matrix 16c of liquid crystal cells. The control means 100 can therefore include one or several microprocessors, one or several microcontrollers, one or several electronic memory units and one or several display interfaces (screen, projector, holographic display, etc.), input interfaces (keyboard, mouse, touchpad, touch screen, etc.), and/or communication interfaces (USB, Ethernet®, Wi-Fi®, Bluetooth®, Zigbee®, etc.). The control means 100 can comprise a computer network sharing data between different elements of the control means, with one or several other computers on the network, or with other networks, for example by an Internet or Ethernet® protocol. In addition to be connected to the digital camera(s), to collect and record the master/partial images therefrom (as defined below), and to the illumination device 16, to ensure the monitoring and possibly acquire operating data therefrom, the control means 100 can comprise or be connected to sensors providing information on the speed of movement of the containers, on the presence of a container at the inspection station or other information on the status of the installation, and/or to actuators of the installation (conveyors, ejectors, etc.). The control means 100 can implement one or several software(s), stored and/or executed locally or remotely, including on one or several remote computer server(s). This or these software(s) preferably comprise one or several software(s) programmed to implement the computer steps of the method according to the invention.

The emitting surface 16s being two-dimensional, two distinct directions, in particular two orthogonal directions, one direction of which can be arbitrarily described as primary direction D1, can therefore be defined in their extent. It will be seen that a secondary direction D2, different from the primary direction D1, preferably orthogonal to the primary direction D1 can also be defined. For example, the primary direction D1 can be a direction parallel to the axis A12 of the container 12 to be inspected, therefore parallel to the fixed axis A13 corresponding to the inspection location 13. In such a case, the secondary direction D2 can be an oblique direction with respect to the axis A12 of the container 12 to be inspected, for example inclined by an angle comprised in the range from 30 to 60 angle degrees with respect to the axis A12 of the container 12, or orthogonal to the primary direction D1, therefore orthogonal to the axis A12.

The use of a two-dimensional matrix 16c of liquid crystal cells, capable of being controlled, is particularly advantageous because it makes it easily to create incident light conditions having at least one polarization property that varies on the emitting surface 16s, thus creating a "target" of variation in at least one polarization property, including a "target" of complex variation and/or a "target" of gradual and continuous variation. The control of the two-dimensional matrix 16c of liquid crystal cells makes it easy to move from a first "target" of variation in at least one polarization property on the emitting surface 16s, to at least one second "target" of variation in the same polarization property on the emitting surface 16s and/or a second "target" of variation in a different polarization property on the emitting surface 16s. This passage from one "target" of variation to another can be carried out at a high frequency, greater than 1 Hz, generally greater than 10 Hz, often greater than 100 Hz.

In general, it will be possible to obtain, thanks to the use of a two-dimensional matrix 16c of liquid crystal cells, a "target" of variation in which a polarization property, for example the orientation $\theta c(i,j)$ of the main axis of polarization and/or the phase shift $\varphi 16c(i,j)$ between the two orthogonal components of the electric field vector of the light derived from the liquid crystal cell $16c(i,j)$ follows a variation which is a periodic function of the position of the liquid crystal cell $16c(i,j)$ considered along one direction, this function being preferably a "non-constant" function over any interval comprised in a period. Likewise, such a function will preferably also be continuous over a period and, even more preferably, continuous over several periods, therefore without a jump between two periods. For example, such a variation can be a sinusoidal type variation, a linear or affine function over each period, etc. It will be seen that, for the implementation of a preferential method, such a variation will be a triangular variation as defined below.

Very particularly, the system 10 is able to configure at least one portion of the two-dimensional matrix 16c of liquid crystal cells such that the at least one of the two polarization properties, among the orientation $\theta c(i,j)$ of the main axis of polarization and/or the phase shift $\varphi 16c(i,j)$ between the two orthogonal components of the electric field vector of the light derived from the liquid crystal cell $16c(i,j)$ follows a variation, in particular a triangular variation, as a function of the position of the liquid crystal cell $16c(i,j)$ considered along the primary direction D1.

Such a triangular variation offers in particular the advantage of improving the sensitivity of the measurement, that is to say the ability to further highlight the strongly refractive defects compared to the poorly refractive defects, the sensitivity of the defect depending on the slope of the crossed dioptric surfaces, at the location of the refractive defect.

(taken from [6]) A refractive defect is a defect that locally causes abnormal refraction, mainly when the defect appears as slope deviations between surfaces or diopters of the wall(s). Sometimes, this is an area of locally very thin and fragile glass wall. The refractive defects also comprise the blisters or air bubbles internal to the wall or on the surface of the glass wall. In this case, the refraction is induced by the presence of additional diopters crossed by the light. It also happens that the blisters are located on the surface of the wall, either closed or open, that is to say burst. The refraction of the defects is high or low, that is to say the deflection of the light is high or low, in other words, the angle of deflection (in angle) by the defects, of the light rays crossing the wall is high or low. The severity of a refractive defect increases if the deflection increases: a slight crease on the surface, poorly refractive, may be acceptable if it only slightly deteriorates the aesthetics of the container, but a highly marked crease, highly refractive, will be rejected. Likewise, the too thin bubbles or regions impact the solidity of the container and these are more serious highly refractive defects, and are to be rejected. It is therefore very advantageous for the detection of the refractive defects to be sensitive to, and therefore dependent on, the refractive power of the defects. This allows saving products by not rejecting the poorly refractive defects, while ensuring the recognition and the rejection of highly refractive defects.

Moreover, the triangular signal also makes it possible to have a defect detection sensitivity which is constant, due to a constant variation of the triangular signal (except in the vicinity of the top of this triangular signal). Also, the sensitivity is homogeneous whatever the measured area. As a result, a given refractive power defect will be detected with an identical signal regardless of the position of the defect on a container. This property also gives the detection good repeatability whatever the conditions of circulation of the containers in the inspection station, such as its orientation about its vertical axis or its position on the conveyor.

In all the systems which will be described, it could be considered that the inspection portion of the emitting surface $16s$ is made up of elementary emitting areas $16s(i,j)$ each emitting an elliptically polarized even linearly emitted light. The light emitted by an elementary emitting area includes two polarization properties, each of which can be the emitted polarization property of interest. The first of these two polarization properties is the orientation of the main axis of polarization of the light emitted by said elementary emitting area $16s(i,j)$, which can also be designated below as being the orientation of emitted polarization of interest $\theta s(i,j)$ (sometimes also simply called polarization direction). The second of these two polarization properties which can be the emitted polarization property of interest corresponds to the phase shift $\varphi 16s(i,j)$ between the two orthogonal components of the electric field vector of the polarized emitted light.

Depending on the embodiments of the system $10$, different systems $10$ will be described, belonging either to a first family of embodiments implementing more particularly, as a variation in the emitted polarization property of interest, a variation in the orientation $\theta s(i, j)$ of the main axis of polarization of the light emitted by each elementary emitting area $16s(i, j)$ of the emitting surface $16s$, or to a second family of embodiments implementing more particularly, as a variation in the emitted polarization property of interest, a variation in the phase shift $\varphi s(i,j)$ between the two orthogonal components of the electric field vector of the light emitted by each elementary emitting area $16s(i,j)$ of the emitting surface $16s$.

In the first family of embodiments, there is a first type of embodiments in which the emitting surface $16s$ is the surface of the two-dimensional matrix $16c$ with liquid crystal cells, and each elementary emitting area $16s(i,j)$ is therefore directly determined by an associated liquid crystal cell $16c(i,j)$. Thus, for the embodiments of this first type, belonging to the first family of embodiments, the orientation $\theta c(i,j)$ of the main axis of polarization induced by a liquid crystal cell $16c(i,j)$ corresponds directly to the orientation $\theta s(i,j)$ of the main axis of polarization, with therefore $\theta s(i,j)=c(i,j)$. For this first type of embodiment, the portion of inspection of the emitting surface $16s$ therefore consists of elementary emitting areas $16s(i,j)$ each emitting an emitted light polarized according to an elliptical polarization having an orientation $\theta s(i,j)$ of the main axis of polarization.

The systems $10$ of FIGS. $1$, $4$ and $5$ are examples of systems $10$ of a first type which belong to the first family of embodiments, more particularly implementing, as a variation of the emitted polarization property of interest, a controlled variation in the orientation $\theta s(i,j)$ of the main axis of polarization of the polarized emitted light. Such systems will for example be implemented advantageously in the case where the technology of the two-dimensional matrix $16c$ of liquid crystal cells rather generates, as a function of the control applied to the liquid crystal cell $16c(i,j)$, a comparatively greater variation in the angular offset (as defined above) of the orientation of the main axis of the polarization ellipse (for example with the use of "TN" type liquid crystal cells). In this first type, the emitted polarization property of interest is therefore directly the orientation $\theta c(i,j)=\theta s(i,j)$ of the main axis of polarization of the light derived from the liquid crystal cell $16c(i,j)$ and therefore emitted by the elementary emitting area. Thus, the control means $100$ of the two-dimensional matrix $16c$ of liquid crystal cells will be able to configure the latter such that the polarized light derived from each of the liquid crystal cells $16c(i,j)$, and therefore derived from each elementary emitting area $16s(i, j)$, has an elliptical polarization with, for each liquid crystal cell $16c(i,j)$ and therefore for each elementary emitting area $16s(i,j)$, an orientation $\theta s(i,j)=\theta c(i,j)$ controlled from the main axis of polarization of the light derived from the liquid crystal cell $16c(i,j)$ and therefore emitted by the elementary emitting area, which follows a variation, in particular a triangular variation, as a function of the position of the elementary emitting area $16s(i,j)$ along the primary direction D1.

It will be noted that, for the systems of the first family of embodiments, more particularly implementing, as a variation of the emitted polarization property of interest, a controlled variation of the orientation $\theta s(i,j)$ of the main axis of polarization of the polarized emitted light, an illumination device $16$ will be preferably chosen in which the polarized light derived from each of the elementary emitting areas $16s(i,j)$ presents an elliptical polarization having an ellipticity ratio less than or equal to 0.7, preferably as low as possible, or even zero. This will allow a more precise determination of the orientation of this main axis of polarization.

A second type of embodiments, also belonging to the first family of embodiments more particularly implementing, as a variation of the emitted polarization property of interest, a controlled variation of the orientation θs(i,j) of the main axis of polarization of the polarized emitted light, is illustrated by the example of FIG. 2. In this example, the illumination device 16 comprises, downstream of the two-dimensional matrix 16c of liquid crystal cells, a quarter-wave retarder plate 16d which forms part of the illumination device 16 and which is arranged in the light path between the two-dimensional matrix 16c of liquid crystal cells and the inspection location 13. In such a system, the emitting surface 16s is then the surface of the quarter-wave retarder plate 16d turned towards the inspection location 13. In such a system, each elementary emitting area 16s(i,j) is an area of the surface of the quarter-wave retarder plate 16d, this area being defined as being the area which, seen from the digital camera 18, is seen with, in the background, a liquid crystal cell 16c(i,j) of the two-dimensional matrix 16c. Each elementary emitting area 16s(i,j) is therefore associated with a liquid crystal cell 16c(i,j) of the two-dimensional matrix 16c. The system of FIG. 2 will for example be implemented advantageously in the case where the technology of the two-dimensional matrix 16c of liquid crystal cells rather generates, as a function of the control applied to the liquid crystal cell 16c(i,j), a comparatively greater variation in the phase shift 16c(i,j) between the two orthogonal components of the electric field vector of the light derived from the liquid crystal cell 16c(i,j) (for example with the use of liquid crystal cells of the "ECB" type). However, in a system 10 thus constructed, by ensuring that the fast axis of the quarter-wave retarder plate 16d is parallel or perpendicular to the axis of polarization A0 of the upstream linear polarizer 16b, the phase shift φ16c(i,j) induced by a liquid crystal cell 16c(i,j) of the two-dimensional matrix 16c is reflected, after crossing the quarter-wave retarder plate 16d, by the emission, by the corresponding elementary emitting area, here of the quarter-wave retarder plate 16d, of a light having a linear polarization with an axis of polarization whose orientation θs(i,j), in the plane of the emitting surface 16s, varies as a function of the phase shift φ16c(i,j) induced by the liquid crystal cell 16c(i,j), and therefore varies as a function of the control applied to the liquid crystal cell 16c(i,j). In a system of this second type, and from what has been explained above concerning the control of the liquid crystal cells 16c(i,j), it is understood that, depending on the control applied to the electrodes of a given liquid crystal cell 16c(i,j), it is possible to vary, therefore to control, the orientation θs(i,j) of the main axis of polarization of the polarized light emitted by the corresponding elementary emitting area 16s(i,j), in particular from an initial value, corresponding to the case where no voltage is applied to the electrodes of the liquid crystal cell 16c(i,j), and to a final value, corresponding to a maximum voltage applied to the electrodes of the liquid crystal cell 16c(i,j).

The system of FIG. 3 is an example of a system 10 according to a third type which belongs to the second family of embodiments implementing more particularly, as a variation of the emitted polarization property of interest, a controlled variation in the phase shift φ16s(i,j) between the two orthogonal components of the electric field vector of the polarized emitted light. In the systems of the third type, the emitting surface 16s is the surface of the two-dimensional matrix 16c with liquid crystal cells, and each elementary emitting area 16s(i,j) is therefore directly determined by an associated liquid crystal cell 16c(i,j). Thus, for the embodiments of this third type, but belonging to the second family of embodiments, the phase shift φ16c(i,j) between the two orthogonal components of the electric field vector induced by a liquid crystal cell 16c(i,j) corresponds directly to the phase shift φ16s(i,j) between the two orthogonal components of the electric field vector of the polarized emitted light, with therefore φ16s(i,j)=φ16c(i,j). Such a system will for example be implemented advantageously in the case where the technology of the two-dimensional matrix 16c of liquid crystal cells rather generates, as a function of the control applied to the liquid crystal cell 16c(i,j), a comparatively greater variation in the phase shift φ16s(i,j)=φ16c(i,j) between the two orthogonal components of the electric field vector of the light derived from the liquid crystal cell 16c(i,j) and therefore emitted by the elementary emitting area (for example with the use of liquid crystal cells of the "ECB" type). In such a case, the emitted polarization property of interest will therefore be the phase shift φ16s(i,j)=φ16c(i,j) between the two orthogonal components of the electric field vector of the light derived from the liquid crystal cell 16c(i,j) and therefore emitted by the elementary emitting area. Thus, the control means 100 of the two-dimensional matrix 16c of liquid crystal cells will be able to configure the latter such that the polarized light derived from each of the liquid crystal cells 16c(i,j), and therefore derived from each elementary emitting area 16s(i,j), has an elliptical polarization with, for each liquid crystal cell 16c(i,j) and therefore for each elementary emitting area 16s(i,j), a phase shift φ16s(i,j)=φ16c(i,j) controlled between the two orthogonal components of the electric field vector of the light derived from the liquid crystal cell 16c(i,j) and therefore emitted by the elementary emitting area, which follows a variation, in particular a triangular variation, as a function of the position of the elementary emitting area 16s(i,j) along the primary direction D1.

A fourth type of embodiment is in the form of systems which are similar to those of the first type of embodiment, but which belong to the second family of embodiments, implementing more particularly, as a variation of the emitted polarization property of interest, a controlled variation in the phase shift φ16s(i,j) between the two orthogonal components of the electric field vector of the polarized emitted light. Such systems will for example be implemented advantageously in the case where the technology of the two-dimensional matrix 16c of liquid crystal cells rather generates, as a function of the applied to the liquid crystal cell 16c(i,j), a variation in the phase shift φ16s(i,j) controlled between the two orthogonal components of the electric field vector of the polarized emitted light which is comparatively greater (for example with the use of "ECB" type liquid crystal cells). In this fourth type, the emitted polarization property of interest is therefore directly the phase shift φ16s(i,j) between the two orthogonal components of the electric field vector of the light derived from the liquid crystal cell 16c(i,j) and therefore emitted by the elementary emitting area. Thus, the control means 100 of the two-dimensional matrix 16c of liquid crystal cells will be able to configure the latter such that the polarized light derived from each of the liquid crystal cells 16c(i,j), and therefore derived from each elementary emitting area 16s(i,j), has an elliptical polarization with, for each liquid crystal cell 16c(i,j) and therefore for each elementary emitting area 16s(i,j), a phase shift φ16s(i,j)=φ16c(i,j) between the two orthogonal components of the electric field vector of the polarized emitted light of the light derived from the liquid crystal cell 16c(i,j) and therefore emitted by the elementary emitting area, which follows a variation, in particular a triangular variation, as a function of the position of the elementary emitting area 16s(i,j) along the primary direction D1.

In all the systems described above 10, belonging to the four types, and from what has been explained above concerning the control of the liquid crystal cells $16c(i,j)$, it is understood that, depending on the control applied to the electrodes of a given liquid crystal cell $16c(i,j)$, it is possible to vary, therefore to control, the orientation $\theta s(i,j)$ of the main axis of polarization and/or the phase shift $\varphi 16s(i,j)$ between the two orthogonal components of the electric field vector of the polarized light emitted by the corresponding elementary emitting area $16s(i,j)$, in particular from an initial value, for example a zero value, corresponding to the case where no voltage is applied to the electrodes of the liquid crystal cell $16c(i,j)$, and to a final value, corresponding to a maximum voltage applied to the electrodes of the liquid crystal cell $16c(i,j)$.

Likewise, it is understood that the variation in the orientation $\theta s(i,j)$ of the main axis of polarization and/or in the phase shift $\varphi 16s(i,j)$ between the two orthogonal components of the electric field vector of the polarized light emitted by the elementary emitting area is a continuous function of the voltage control applied to the electrodes of the associated liquid crystal cell $16c(i,j)$. On the other hand, as seen above, the variation in the orientation $\theta s(i,j)$ of the main axis of polarization and/or in the phase shift $\varphi 16s(i,j)$ between the two orthogonal components of the electric field vector of the light emitted by the elementary emitting area $16s(i,j)$ is not necessarily a linear or affine function of the voltage control applied to the electrodes of the associated liquid crystal cell $16c(i,j)$, but this can be taken into account in a preliminary calibration procedure.

Such a preliminary calibration procedure can in particular comprise the acquisition, for example with a polarimetric digital camera, possibly with the interposition of a quarter-wave retarder plate, of a series of calibration images of the emitting surface $16s$. For each calibration image of the calibration series, the illumination device $16$ can be controlled by applying, for each calibration image, a known predetermined control voltage to the electrodes of each liquid crystal cell $16c(i,j)$ of the two-dimensional matrix $16c$. For example, for each image of the series, the illumination device $16$ can be controlled by applying, for each calibration image, the same known predetermined control voltage to the electrodes of each liquid crystal cell $16c(i,j)$ of the two-dimensional matrix $16c$. Between each calibration image, the known predetermined control voltage at the electrodes of each liquid crystal cell $16c(i,j)$ of the two-dimensional matrix $16c$ is varied in increments, between a minimum value and a maximum value. For each calibration image, a polarization property value received by the camera is recorded for each elementary emitting area $16s(i,j)$, this value makes it possible, possibly by taking into account known elements in the path of the light, for example the presence of a quarter-wave retarder plate $34$ in the case of FIG. $3$, to determine the value of the emitted polarization property of interest (orientation of the main axis of polarization and/or phase shift) as a function of the applied voltage in order to determine, for each elementary emitting area $16s(i,j)$, a calibration relationship between the voltage applied to the electrodes of the liquid crystal cell $16c(i,j)$ and the value of the emitted polarization property of interest coming from this elementary emitting area $16s(i,j)$, as received by the sensor of the camera.

In all types of embodiments, in particular those belonging to the first family, the orientation $\theta s(i,j)$ of the main axis of polarization of the light emitted by the elementary emitting area can be indicated with respect to a reference orientation. The reference orientation for defining the orientation $\theta s(i,j)$ of the main axis of polarization of the light emitted by the elementary emitting area $16s(i,j)$ will be for example by definition the orientation of the main axis polarization when no voltage is applied to the electrodes of the liquid crystal cell. It appears that, following the characteristics of the two-dimensional matrix $16c$ of liquid crystal cells, the final orientation value $\theta s(i,j)$ of the main axis of polarization, corresponding to the maximum voltage applied to the electrodes of the liquid crystals cell $16c(i,j)$, can reach, relative to the reference orientation, an angle of at least 45 degrees, preferably at least 70 angle degrees, and even more preferably at least 90 angle degrees.

In all types of embodiments, as in the example of FIG. $6$, the triangular variation of the emitted polarization property of interest $P(D1)$ is such that each primary period $T1$ is divided into only two parts: an increasing part $T1c$ and a decreasing part $T1d$. In the increasing part, the emitted polarization property of interest $P(D1)$ is an increasing linear function of the position of the elementary emitting area along the primary direction $D1$ and, on this increasing part, the emitted polarization property of interest $P(D1)$ increases from a primary lower value P1min to a higher primary value P1max. In the decreasing part, the emitted polarization property of interest $P(D1)$ is a decreasing linear function of the position of the elementary emitting area along the primary direction $D1$, the emitted polarization property of interest $P(D1)$ decreases from the primary upper value P1max to the primary lower value P1min.

In all cases, the triangular variation of the emitted polarization property of interest which is obtained on the emitting surface $16s$ is therefore a function which is continuous, which is periodic according to a primary period $T1$ along the primary direction $D1$ of the emitting surface $16s$ and which, over each period $T1$, is made up of two successive linear parts $T1c$ and $T1d$.

It will be seen that such a configuration of emitting surface $16s$ makes it possible, within the framework of a suitable method, to detect refractive defects at all points of an inspected area with homogeneous sensitivity over the entire inspected area, and with high sensitivity.

Preferably, the increasing part $T1c$ and the decreasing part $T1d$ of each primary period $T1$ are of equal extent along the primary direction $D1$. In other words, the slope of variation of the increasing linear function and the slope of variation of the decreasing linear function are preferably equal.

It will be noted that the linear and continuous nature of the triangular variation over each half-period must be appreciated with regard to the necessarily discontinuous nature of the illumination device $16$. Indeed, the triangular variation is obtained by a differentiated control of the liquid crystal cells of the two-dimensional matrix $16c$. The cells necessarily have an extent along the primary direction $D1$, therefore each elementary emitting area also has a corresponding extent over which the emitted polarization property of interest is constant. However, in view of the precision required for the method, it is possible to have a two-dimensional matrix $16c$ of liquid crystal cells configured so that, seen from the sensor of the camera, the variation has a continuous and linear appearance on each increasing part and on each decreasing part of each period.

Preferably, for the acquisition of a given primary partial image in the method (which will be explained below), the illumination device $16$ is controlled such that the emitted polarization property of interest of the light emitted by the elementary emitting areas follows said triangular variation as a function of the position of the elementary emitting area along the primary direction $D1$, but is constant along a direction $D2$ perpendicular to the primary direction $D1$. Thus, the emitted polarization property of interest varies along a single direction D1 of the emitting surface and is constant along the perpendicular direction D2.

In preferred embodiments, the digital camera is a polarimetric digital camera 18, the system being able in this case to include a single digital camera.

Polarimetric cameras are in particular known, in which the polarimetric camera includes a two-dimensional photoelectric sensor 22, the principle of which is illustrated in FIGS. 7 and 8. The photoelectric sensor 22 comprises photoelectric elements $26(n,k)$ which each comprise a photoelectric cell $28(n,k)$ in front of which an individual linear analyzer $30(n,k)$ associated with the photoelectric cell $28(n, k)$ of this photoelectric element $26(n,k)$ is arranged, the photoelectric sensor 22 including a number N of distinct groups of 4 contiguous photoelectric elements whose individual linear analyzers $30(n,k)$ each have an axis of polarization Ak, the four axes of polarization Ak of a given group of 4 photoelectric elements forming two pairs A1, A2 and A3, A4 of orthogonal axes of polarization, the two pairs being offset from each other by 45 angle degrees. The notation used in the present text identifies a photoelectric element $26(n,k)$, or a photoelectric cell $28(n,k)$ or an individual polarization analyzer $30(n,k)$ by the doublet of index (n,k), the index n (which varies from 1 to N) making it possible to identify the group $26(n)$ to which it belongs, and the index k (which varies from 1 to 4) making it possible to identify its serial number in the group, the index k therefore being indicative of the orientation of the axis of polarization Ak of the individual polarization analyzer $30(n,k)$ of this photoelectric element $26(n,k)$. The photoelectric sensor 22 of FIG. 7 thus determines four families of photoelectric elements $26(n,k)$ which correspond to four distinct polarization analysis characteristics, those determined by the individual polarizing filters $30(n,k)$. Thus, the four distinct polarization analysis characteristics are four linear analyzes along the four distinct axes of polarization, for example two pairs A1, A2 and A3, A4 of orthogonal axes of polarization, the two pairs being offset from each other by 45 angle degrees, in one direction or the other.

In the examples described below, the following conventions have been taken:

the axis of polarization A1 of the individual polarizing filters $30(n,1)$) is parallel to the axis of polarization A0 of the upstream linear polarizer 16b;

the axis of polarization A2 of the individual polarizing filters $30(n,2)$ is offset by 90 angle degrees with respect to the axis A1;

the axis of polarization A3 of the individual polarizing filters $30(n,3)$ is offset by 45 angle degrees in a given direction with respect to the axis A1;

the axis of polarization A4 of the individual polarizing filters $30(n,4)$ is offset by 135 angle degrees in the same given direction with respect to the axis A1.

Such a polarimetric camera 18, through its photoelectric sensor 22, therefore delivers a digital image, called master image IM, which can include as many pixels, called master pixels Pm(n,k), as the number 4×N of photoelectric elements. In such a master image IM, groups of pixels can be defined, each group of pixels being hereinafter a composite pixel Pc(n), where each composite pixel Pc(n) groups together the master pixels Pm(n,k) which correspond to a given group $26(n)$ of contiguous photoelectric elements, as defined above. Thus, to each distinct group $26(n)$ of contiguous photoelectric elements corresponds a composite pixel Pc(n) in the master image delivered by the photoelectric sensor 22. A composite pixel Pc(n) therefore includes 4 master pixels Pm(n,k). A composite pixel Pc(n) can be considered as the image of an elementary area of the imaged field, therefore in particular, an elementary area of the container 12 which was at the inspection location 13 at the time of acquisition of the master image IM.

Moreover, as illustrated more particularly in FIG. 9, it can also be considered that the master digital image IM comprises the number K of distinct partial digital images IPk (with k integer varying from 1 to K) each having N partial pixels Ppk(n). The partial pixels Ppk(n) of each partial digital image IPK correspond, for a given partial digital image IPk, to the photoelectric elements $26(n,k)$ of the sensor 22 including the individual linear analyzer $30(n,k)$ which have the same axis of polarization. In other words, all the partial pixels Ppk(n) of a given partial image IPk are acquired through individual linear analyzers Ppk(n) which have a common axis of polarization Ak for the partial digital image IPk. It is noted that each partial pixel of a partial digital image IPk is taken from one of the N composite pixels of the master digital image IM from which the considered partial digital image IPk is extracted. A partial pixel Ppk(n) of a partial image IPK is therefore a master pixel Pm(n,k) of the master image IM acquired by the polarimetric camera 18.

Advantageously, the partial images IPk can be superposed pixel by pixel. Indeed, for a given elementary area of the container 12, it is known that the different master pixels Pm(n,k) of the composite pixel Pc(n) corresponding to the given elementary area are distributed, in the form of partial pixels Ppk(n), in each partial image IPk, with a single master pixel Pm(n,k) of the composite pixel Pc(n), in the form of a partial pixel Ppk(n), in each partial image IPk. It is understood here that, on the scale of the resolution of the master image IM, there is an offset between two partial images IPK, an offset which is known as a function of the known offset between the photoelectric elements $26(n,k)$ within a group $26(n)$. On the other hand, at the scale of the resolution of the partial images IPk, the partial images IPk can be considered as perfectly and directly superimposable, because two partial pixels Ppk(n) extracted from the same composite pixel will be images, certainly partial images, of the same elementary area of the imaged field, therefore of the container 12.

For example, the polarimetric cameras of the series XCG-CP marketed by the SONY group companies operate according to this principle. The same SONY group companies market two-dimensional photoelectric sensors which integrate a system of individual linear polarizing filters each associated with a photoelectric cell according to the principle above. These sensors, known under the references IMX250MZR/MYR, IMX253MAR/MYR, or even IMX264MZR/MYR, of CMOS technology, include individual linear polarizing filters formed directly on the component. A system will be described below in more detail in one embodiment implementing such a camera. Other manufacturers of cameras that can be implemented within the scope of the invention include the company Lucid Vision Labs, Inc, 130-13200 Delf Place, Richmond B.C., Canada, V6V 2A2.

The use of such a camera makes it possible to obtain, in a single acquisition, a series of several images of the same inspected area, described in the sequence as partial images, in which each partial image contains an image of the inspected area but receives the light through a linear polarization analyzer whose axis of polarization has its own orientation. With a polarimetric digital camera as described above, the partial images obtained are then necessarily acquired along the same optical axis. In addition, the partial images obtained are then directly superimposable such that each elementary area of the inspected area of the container is imaged by a corresponding partial pixel in each of the partial digital images of the series, so that the images do not need a calculation time-consuming registration operation.

In other embodiments, conventional matrix digital cameras could be used, including a two-dimensional, monochrome or color photoelectric sensor, but insensitive to the polarization of the light. In such embodiments, a set of several cameras, for example a set of two digital cameras 18.1, 18.2 which will in this case each be associated with their own linear polarization analyzer 30.1, 30.2 will then be used as illustrated in FIG. 4, the axes of polarization A1, A2 of the two linear polarization analyzers 30.1, 30.2 then being different from each other, preferably orthogonal to each other. In such cases, the digital image delivered by each of the two digital cameras 18.1, 18.2 will be called partial digital image.

In the example of FIG. 4, a semi-reflective plate 36 which is disposed perpendicular to the optical axis of a first 18.1 of the two digital cameras is provided, this in order to allow the return of part of the emergent light emanating from the container 12 towards the second 18.2 of the two digital cameras. The use of such a semi-reflective plate 36 makes it possible, with a fine adjustment of the position of the two digital cameras, to ensure that it observes the container along the same optical axis, at least in the area of the inspection location 13. In this way, although the two digital cameras 18.1 18.2 are not positioned in the same place, the digital images they acquire are directly superimposable, without the need for a calculation time-consuming registration operation.

However, it could be entirely envisaged that the set of several digital cameras 18.1, 18.2 are disposed side by side to observe the inspection location 13, and therefore the container 12, along two distinct optical axes. In such a case, the digital images acquired by the use of several digital cameras will need to be computationally registered in order to be superimposable. The registration matrix can for example be obtained as part of a prior calibration operation. Such a system comprising a set of several digital cameras, for example two digital cameras, with optical axes that do not coincide in the area of the inspection location 13, could in particular be used when the illumination device is controlled such that the emitted polarization property of interest varies along a single direction D1 of the emitting surface and is constant along the perpendicular direction D2. In this case, it will be advantageous for the optical axes of the cameras in the set of several digital cameras to define a plane that contains the direction perpendicular to the primary direction D1, therefore that contains the direction D2 according to which the emitted polarization property of interest is constant.

In the examples, the case in which the digital camera(s) 18, 18.1, 18.2 are oriented so as to be perpendicular to the wall of the container 12 which must be inspected have been illustrated. However, it is entirely possible to provide that the optical axis of the camera(s) 18, 18.1, 18.2 observe the container 12 at a high-angle or low-angle shot with respect to the main axis A12 of the container 12, for example as illustrated in FIG. 11. Preferably, the optical axis of the digital camera(s) 18, 18.1, 18.2 forms an angle greater than 45°, preferably greater than 60° with the main axis A12 of the container 12.

It is also noted that some of the systems 10, in particular the systems 10 belonging to the second type or to the third type, include, in the path of the light between the two-dimensional matrix 16c of liquid crystal cells and the linear analyzers 30(n,k), 30.1, 30.2, a quarter-wave retarder plate 16d, 34. Preferably, this quarter-wave retarder plate 16d, 34 has a fast axis oriented parallel or perpendicular to the axis of polarization A0 of the upstream linear polarizer 16b.

The presence of such a quarter-wave retarder plate 16d, 34 makes it possible to recover, at the level of the polarimetric camera 18 or at the level of the linear analyzers 30.1, 30.2 of the conventional digital cameras 18.1, 18.2, an elliptically (in some cases linearly) polarized light whose main axis of polarization has an orientation that varies as a function of the control setpoint applied to the corresponding liquid crystal cell 16c(i,j) belonging to the two-dimensional matrix 16c.

However, as can be seen for the systems 10 belonging to the first family, the presence of such a quarter-wave retarder plate is not obligatory, as shown for example in the embodiments of FIGS. 1, 4 and 5. In such a case, an elliptically polarized light is recovered at the level of the polarimetric camera 18 or at the level of the linear analyzers 30.1, 30.2 of the conventional digital cameras 18.1, with the orientation θs(i,j) of the main axis of polarization of the polarized emitted light that varies as a function of the control applied to the corresponding liquid crystal cell 16c(i,j) belonging to the two-dimensional matrix 16c.

In the presence of a quarter-wave retarder plate in the path of the light, it can occupy either of the following preferential positions.

In the embodiment of FIG. 2, of the second type, the quarter-wave retarder plate 16d forms part of the illumination device 16 and is arranged in the light path between the two-dimensional matrix 16c of liquid crystal cells and the inspection location 13 at which the container 12 to be inspected must be placed. In this case, it is seen that the incident light that illuminates the container 12 is a linearly polarized light whose axis of polarization has an orientation θs(i,j) that varies as a function of the control applied to the corresponding liquid crystal cell 16c(i,j) belonging to the two-dimensional matrix 16c.

In the embodiment of FIG. 3, of the third type, the quarter-wave retarder plate 34 is arranged in the path of the light between on the one hand the inspection location 13 at which the container 12 to be inspected must be placed, and, on the other hand, the linear analyzers 30(n,k), 30.1, 30.2 respectively of the polarimetric camera 18 or of the conventional digital cameras 18.1, 18.2, therefore downstream of the container 12 to be inspected. In this case, it is seen that the incident light that illuminates the container 12 is an elliptically polarized light, with a phase shift φ16s(i,j) between the two orthogonal components of the electric field vector that varies as a function of the control applied to the corresponding liquid crystal cell 16c(i,j) belonging to the two-dimensional matrix 16c. it is noted that, as schematically represented in the drawings, the disposition of the quarter-wave retarder plate downstream of the container 12 makes it possible to use a quarter-wave retarder plate 34 of dimensions smaller than the corresponding dimensions of the area to be inspected of the container, in any case when the digital camera(s) include a conventional objective lens with a divergent, therefore non-telecentric, field of view. In these embodiments, the quarter-wave retarder plate 34 is interposed between the container 12 and the photoelectric elements 26(n,k) of the photoelectric sensor 22. The quarter-wave retarder plate 34 interposed in the path of the light downstream of the inspection location 13 can form part of the polarimetric camera 18, either by being integrated into the photoelectric sensor 22, or by being placed between the objective lens 24 and the photoelectric sensor 22, or by being integrated into the objective lens 24. However, as in the example illustrated in FIG. 3, the quarter-wave retarder plate 34 can be placed between the inspection location 13 of the system 10, at which the container 12 must be placed in order to be inspected, and the objective lens 24 of the polarimetric camera 18. In a non-illustrated example, but which would be of the third type while comprising, in a manner comparable to the example of FIG. 4, two conventional digital cameras, the quarter-wave retarder plate 34 would be placed between the inspection location 13 of the system 10, at which the container 12 must be placed in order to be inspected, and the respective linear analyzers 30.1, 30.2 of the conventional digital cameras 18.1, 18.2. In such an example, it could be possible to provide two quarter-wave retarder plates 34, each of which would be placed downstream of the semi-reflective plate 36, but it could also be possible to alternatively provide for a single quarter-wave retarder plate 34 placed between the inspection location 13 of the system 10, at which the container 12 must be placed to be inspected, and the semi-reflective plate 36.

The systems 10 as described above are examples of systems that make it possible to each implement at least some of the variants of an optical computing method for inspecting in through light a glass container by using a digital camera, as described below. The method includes first computer steps, in particular computer calculation steps that could for example be carried out by the computer calculation unit 110. In the system 10, the computer calculation unit 110 can thus be programmed to carry out all or part of the method or methods described below.

The methods described below are optical computing methods for inspecting in through light a glass container moving along a movement trajectory. These methods are therefore implemented to inspect a glass container when the latter is brought to the inspection location 13 of the system 10.

The main steps of one exemplary embodiment of such a method are described below with reference to the diagram of FIG. 10.

The method includes the illumination 1010 of the container 12 by an illumination device, for example by an illumination device 16 as described above.

The method includes the observation 1020 of the container, by at least one digital camera. Depending on the systems 10 implemented, it was seen that there could be a single polarimetric camera 18, or a set of several conventional digital cameras, in particular two conventional digital cameras 18.1, 18.2, each equipped with a corresponding linear polarization analyzer 30.1, 30.2. In all cases, the digital camera(s) 18, 18.1, 18.2 each include a two-dimensional photoelectric sensor comprising photoelectric elements which each comprise a photoelectric cell corresponding to a pixel in an image acquired by the digital camera. As this is a through light inspection, the at least one digital camera 18, 18.1, 18.2 is located, with respect to the movement trajectory T, on the side opposite to that of the illumination device 16, so as to collect, by the at least one digital camera 18, 18.1, 18.2, an emergent light emanating from the container 12 located at the inspection location 13.

The method includes the acquisition 1030, with the at least one camera 18, 18.1, 18.2, of digital images which will hereinafter be called partial digital images IPk. More specifically, this acquisition includes the acquisition, for a given container, of at least one series Sm (m being an integer identifying the series Sm) comprising, for at least a first series S1, at least a first partial digital image IP1.1 and a second partial digital image IP2.1. Each partial digital image IPk.m of a given series Sm for a given container contains an image of the same inspected area of the container. Each partial digital image IPk.m comprises N partial pixels, each of which is the image of a corresponding elementary area of the container. Each partial digital image IPk.m is acquired with the interposition, between the container 12 and the photoelectric cells of the at least one camera 18, 18.1, 18.2 that acquires this partial digital image, of a linear analyzer having a given axis of polarization Ak for a given partial digital image. For the acquisition of the first partial digital image IP1.*m* and of the second partial digital image IP2.*m* of the same series Sm for a given container 12, the axes of polarization A1, A2 of the implemented linear analyzers are distinct from each other, preferably orthogonal to each other.

In the embodiments including a set of several conventional digital cameras 18.1 and 18.2, such as for example the embodiment illustrated in FIG. 4, each of the cameras in the set of several conventional digital cameras acquires a partial digital image, through respectively the linear polarization analyzer 30.1, 30.2 associated therewith. Thus, in the case of a set of several cameras comprising at least two conventional digital cameras 18.1 and 18.2, a first conventional digital camera 18.1 acquires, for a given container and for a given series Sm for this container, a first partial image IP1.*m*, through a first linear polarization analyzer 30.1 having a first axis of polarization A1, and a second conventional digital camera 18.2 acquires, for the same given container and for the same given series for this container, a second partial image IP2.*m*, through a second linear polarization analyzer 30.2 having a second axis of polarization A2 different from the first axis of polarization, preferably orthogonal to the first axis of polarization.

In the embodiments which implement a polarimetric camera 18, the acquisition of a series Sm comprising at least a first partial digital image IP1.*m* and at least a second partial digital image IP2.*m* can be carried out in a single acquisition with the acquisition of a master image IM.m delivered by the polarimetric camera 18, the master image IM.m comprising, as seen above, four partial digital images IPk.m, the four partial digital images IPk.m each corresponding to a common axis of polarization Ak for the individual linear analyzers 30$(n,k)$ through which the partial pixels PPk.m(n) of the considered partial digital image IPk.n are acquired. For a given series Sm, the first partial digital image IP1.*m* and the second partial digital image IP2.*m* will therefore be chosen among the four partial digital images IPk.m delivered by the polarimetric digital camera 18, preferably by choosing a pair of images corresponding to two axes of polarization A1, A2, A3, A4 orthogonal to each other.

In all cases, the partial digital images IPk.m of the same series Sm are superimposable such that each elementary area of the inspected area of the container 12 is imaged by a corresponding partial pixel Ppk.m in each of the partial digital images IPk.m from the series Sm.

As indicated above, the acquisition 1030 provides for the acquisition, for a given container, of at least one series Sm of partial digital images IPk.m, and therefore of at least one primary series S1 of partial digital images IPk.1.

For the primary series S1, the partial digital images IPk.1 of the primary series S1 each contain, in the background, the image of the same primary inspection portion of the emitting surface 16s. It is noted here that it is assumed that it is possible to ignore any phenomenon of diffusion of the light through the container, which is therefore considered transparent. The primary inspection portion is observed through the container 12 by the digital camera(s). The primary inspection portion is therefore the portion of the emitting surface which is seen, at the time of acquisition of the primary series S1 of primary partial digital images IPk.1, through the inspected area of the container 12 by the or digital camera(s). For the acquisition of the primary series S1, the illumination device 16 is controlled so that, on the primary inspection portion of the emitting surface, the law of periodic variation of the emitted polarization property of interest shows, along a primary direction D1 of the emitting surface, a primary periodic variation, and has several primary periods T1 over the extent of the primary inspection portion along the primary direction D1. More specifically, for the acquisition of the primary series S1 of partial digital images IPk.1, the emitted polarization property of interest of the lights emitted by the elementary emitting areas of the primary inspection portion of the emitting surface 16s follows, over a primary period T1, a triangular variation as a function of the position of the elementary emitting area along the primary direction D1, this triangular variation having several successive primary periods T1, each of which shows such a triangular variation of the emitted polarization property of interest as a function of the position of the elementary emitting area along the primary direction D1.

Preferably, for a given container 12, the partial digital images IPk.m of the same series Sm are acquired at the same moment. This simultaneity in the acquisition of the partial digital images IPk.m of the same series Sm is of course obtained intrinsically when a polarimetric digital camera 18 is used for the acquisition. In the case of a system implementing a set of several conventional digital cameras 18.1, 18.2, the control means 100 of the system 10 will be programmed so that the cameras of the set of several conventional digital cameras 18.1, 18.2 are synchronized in order to carry out their respective acquisitions at the same moment. This acquisition at the same moment makes it possible to avoid the risk of shake of the container 12 that would exist if the partial digital images of the same series were acquired at different times.

In some embodiments, in particular those implementing a polarimetric camera 18 as defined previously, it is possible, for the same inspected area of the same container 12, to carry out the acquisition, for a given series Sm, for example the primary series S1, of a third partial digital image IP3.1 and of a fourth partial digital image IP4.1 for which the axes of polarization A3, A4 of the linear analyzers are distinct from each other and distinct from the axes of polarization A1, A2 of the linear analyzers for the first partial digital image IP1.1 and the second partial digital image IP2.1 of the series, preferably orthogonal to each other and offset by 45 angle degrees from the axes of polarization A1, A2 of the linear analyzers for the first partial digital image IP1.1 and the second partial digital image IP2.m of the series S1. It will be seen that the acquisition of a third partial digital image IP3.1 and of a fourth partial digital image IP4.1 allows for better homogeneity in the calculation of the raw refraction image which will be described below.

Indeed, after the acquisition of the partial digital images IPk.1 for the primary series S1, the method includes the computer calculation 1040 of at least one primary raw refraction image IR1, from the partial digital images IPk.1 of the primary series S1, by calculating, for each of the elementary areas of an inspected area of the container, a primary raw refraction pixel $Pr1(n)$ whose value is representative of the refraction induced by the elementary area of the inspected area, from the value of the corresponding partial pixels $Ppk.1(n)$ which are the image of the elementary area in the partial digital images IPk.1 of the primary series S1.

Indeed, in the example, the primary raw refraction pixel will have a value that will depend on the value of the polarization property of interest emitted by the elementary emitting area of the emitting surface which is seen, by the primary raw refraction pixel (more specifically by the given group $26(n)$ of contiguous photoelectric elements which deliver the corresponding partial pixels $Ppk.1(n)$ which are the image of the elementary area of the container), in the background through the corresponding elementary area of the container. However, which of the elementary emitting areas thus seen depends on the refraction induced by the elementary area of the inspected area. Indeed, by traveling, in the opposite direction of the propagation, through the light path from a partial pixel to an elementary emitting area of the emitting surface, a refraction occurs at each crossing of a diopter, therefore of a surface of the glass wall of the crossed container. This light path therefore depends on the refraction. Therefore the elementary emitting area of the emitting surface connected by this light path to a partial pixel depends on the induced refraction. And, as distinct elementary areas do not have the same emitted polarization property value of interest, it follows that the value of the primary raw refraction pixel $Pr1(n)$ is representative of the refraction induced by the elementary area of the inspected area.

To the extent that the polarization property of the lights emitted by the elementary emitting areas of the primary inspection portion of the emitting surface 16s follows a triangular variation as a function of the position of the elementary emitting area along the primary direction D1, a primary raw refraction pixel $Pr1(n)$ will have a value that will be representative of the refraction induced by the elementary area of the inspected area, in the sense that it will be representative of the refraction according along the primary direction D1.

The refraction along a given direction, for example along the primary direction D1, can be defined as the component, along the given direction, of the change in the direction of propagation of the light for the light rays that cross this elementary area.

In one preferred example, D1 is parallel to the axis A12 of the inspected container. For a perfect theoretical container 12 whose body would have the shape of a glass cylinder of constant thickness, the refraction of the light rays derived from the emitting surface 16s and crossing the optical center of the objective lens 24 (therefore the main rays) is still the same, uniform and predictable in the direction D1. In the primary raw refraction image IR1, each primary raw refraction pixel $Pr1(n)$ theoretically (in the absence of a refractive defect) has an expected property value which corresponds to the polarization property of light emitted by an emitting area, and which therefore follows a triangular function of the position of each primary raw refraction pixel $Pr1(n)$ in the image along the direction D1. If the primary raw refraction pixel $Pr1(n)$ belongs to the image of a defect producing a refraction anomaly of a given angle on the path of the light derived from the elementary area of the inspected area, the primary raw refraction pixel $Pr1(n)$ will have a value corresponding to the polarization property value of interest emitted from another elementary emitting area $16s(i,j)$, therefore a value different from the one expected and, as the triangular variation function is continuous and linear piecewise, the deviation between the calculated value and the expected value is a function of the refraction anomaly, that is to say a function of the deflection of the light beams in relation to their propagation in the air or through a perfect container.

Depending on the system 10 implemented, but also depending on the number of partial digital images acquired for a given series, for the given container 12, different calculation algorithms can be implemented, which will be detailed below.

In such a primary raw refraction image IR1, it will be possible to detect anomalies induced by refractive defects in the inspected area of the container. Indeed, in the primary raw refraction image IR1, a primary raw refraction pixel $Pr1(n)$ is calculated for each elementary area of the inspected area of the container. However, for a given elementary area of the container, the value of this primary raw refraction pixel $Pr1(n)$ necessarily depends on the value of the polarization property of interest emitted from the elementary emitting area which is seen through the given elementary area of the container. For two given elementary areas of the container which are close to each other, but which are offset from each other along the primary direction D1, two primary raw refraction pixel values have therefore been calculated: a value $Pr1(n)$ corresponding to a first elementary area, and a value $Pr1(n')$ corresponding to the second elementary area of the container. In the absence of any refraction anomaly induced by a refractive defect, this area of the container (or therefore in the absence of a container at the inspection location 13), the variation between these two primary raw refraction pixel values would be therefore only the reflection of the variation between the values of the emitted polarization property of interest for the two corresponding elementary emitting areas of the emitting surface 16s, which variation is known and is a triangular variation. In the presence of the container 12, the latter can, in the absence of any refractive defect, induce some refraction value. However, for two given elementary areas of the container which are close to each other, and offset from each other along the primary direction D1, it is expected that, in the absence of a refractive defect, the variation between the two corresponding primary raw refraction pixel values $Pr1(n)$ and $Pr1(n')$ is a linear variation reflecting the linear variation between the values of the emitted polarization property of interest for the two corresponding elementary emitting areas. If this is not the case, and therefore if, for two given elementary areas of the container which are close to each other, and offset from each other along the primary direction D1, an abrupt variation between the two values $Pr1(n)$ and $Pr1(n')$ of the corresponding primary raw refraction pixels is observed, then it will be possible to conclude to the presence of a refraction anomaly, which it will be possible to assign to the presence of a refractive defect. In addition, the deviation in values between two primary raw refraction pixels $Pr1(n)$ and $Pr1(n')$ aligned in the direction D1 directly depends on the distance in the direction D1 between the two elementary areas of the inspected area that they each see in the background of the container.

It is however noted that, starting only from the partial digital images acquired in the primary series S1, it will be possible to detect only refractive defects which induce a refraction with a refraction angle in a plane containing the primary direction D1.

In particular, in the cases where the emitted polarization property of interest of the light emitted by the elementary emitting areas is constant along a direction perpendicular to the primary direction D1, a refractive defect that would induce a refraction, with a refraction angle contained in a plane perpendicular to the primary direction D1, would not be detectable.

To be able to reliably detect the refractive defects whatever the orientation of the refraction they generate, it is therefore advantageous that, for the same inspected area of the same container 12, the acquisition includes the acquisition of at least one secondary series S2 of partial digital images IPk.2 comprising at least a first partial digital image IP1.2 and a second partial digital image IP2.2.

Strictly similarly to what was seen for the primary series S1, it is expected that, for the secondary series S2, the partial digital images IPk.2 each contain, in the background, the image of a same secondary inspection portion of the emitting surface 16s, the secondary inspection portion being observed through the container 12 by the digital camera and, on the secondary inspection portion of the emitting surface, the law of periodic variation of the emitted polarization property of interest showing, along a secondary direction D2 of the emitting surface, different from the primary direction D1, preferably orthogonal to the primary direction D1, a secondary periodic variation, and having several secondary periods T2 over the extent of the secondary inspection portion along the secondary direction D2. Just like what was defined for the variation of the emitted polarization property of interest along the primary direction D1, over a secondary period T2, the emitted polarization property of interest of the lights emitted by the elementary emitting areas of the secondary inspection portion of the emitting surface 16s preferably follows a triangular variation as a function of the position of the elementary emitting area along the secondary direction D2. The secondary period T2 may be equal to or different from the primary period T1.

Preferably, the primary inspection portion of the emitting surface 16s and the secondary inspection portion of the emitting surface 16s are not coincident in both time and space.

In other words, the primary inspection portion of the emitting surface 16s and the secondary inspection portion of the emitting surface 16s may be coincident in time, that is to say be activated at the same time, but not be coincident in space. For example, the primary inspection portion and the secondary inspection portion of the emitting surface 16s may be distinct portions of the emitting surface 16s. In such a case, the illumination device 16 can include two components or a set of distinct physical components, for example two sets of distinct physical components, each of them taking for example the form of the set of physical components described for the illumination device in the embodiments of FIGS. 1 to 5, with a first set of physical components comprising the primary inspection portion of the emitting surface 16s, and a second set of physical components comprising the secondary inspection portion of the emitting surface 16s, the emitting surface 16s being in this case distributed over the two sets of physical components. Alternatively, the primary inspection portion and the secondary inspection portion of the emitting surface 16s can be distinct portions of an emitting surface 16s formed by a single set of physical components as described for the illumination device in the embodiments of FIGS. 1 to 5. In this case where the primary inspection portion of the emitting surface 16s and the secondary inspection portion of the emitting surface 16s are not coincident in space, the method can include the acquisition, for the same inspected area of the same container, of the primary series of partial digital images and of the secondary series of partial digital images at the same moment or at different moments. In this case where the primary inspection portion of the emitting surface 16s and the secondary inspection portion of the emitting surface 16s are not coincident in space, the primary series of partial digital images and the secondary series of partial digital images can be acquired respectively with different cameras, possibly at different inspection locations along the trajectory of travel of the containers.

Conversely, the primary inspection portion of the emitting surface 16s and the secondary inspection portion of the emitting surface 16s may be coincident in space, or at least partially coincident in space, but not be coincident in time, that is to say be activated at different moments. This turns out to be possible in particular with the implementation of a two-dimensional matrix 16c of liquid crystal cells, since by changing the control of the dimensional matrix 16c of liquid crystal cells, it is possible, at a first moment, to generate on a portion of the emitting surface 16s a variation in the polarization property of interest emitted only along the primary direction D1 and, at a second moment different from the first moment, generate, on the same portion of the emitting surface 16s, a variation in the same polarization property of interest emitted only along the secondary direction D2. Thus, in the latter case, the primary inspection portion and the secondary inspection portion correspond to two different polarization states, at different moments, of the same inspection portion of the emitting surface 16s. In this case, it is understood that what is considered as the same inspection portion of the emitting surface 16s must of course cover the positions of the container at the two acquisition moments, respectively of the primary series and of the secondary series. If the article is moving between the two acquisition moments, said same inspection portion of the emitting surface 16s must of course cover the positions of the container at these two instants, although the article will not have exactly the same relative position with respect to said same inspection portion. What matters here is that said same inspection portion, which is implemented for the acquisition of the primary series and of the secondary series, must change the polarization state, with regard to the emitted polarization property of interest, between the moment of acquisition of the primary series and the moment of acquisition of the secondary series. For the moment of acquisition of the primary series, the polarization property of the lights emitted by the elementary emitting areas of the inspection portion of the emitting surface 16s follows a triangular variation as a function of the position of the elementary emitting area along the primary direction D1. For the moment of acquisition of the secondary series, the polarization property of the lights emitted by the elementary emitting areas of the same inspection portion of the emitting surface 16s follows a triangular variation as a function of the position of the elementary emitting area along the secondary direction D2. In this case where the primary inspection portion of the emitting surface 16s and the secondary inspection portion of the emitting surface 16s are coincident in space, the acquisition, for the same inspected area of the same container, of the primary series of partial digital images and of the secondary series of partial digital images is carried out at different moments. In this case, the primary series of partial digital images and the secondary series of partial digital images can be acquired with the same polarimetric camera 18 or with the same set of several conventional digital cameras 18.1, 18.2. Thus, it will be possible to implement a system 10 in which the control of the two-dimensional matrix 16c of liquid crystal cells is synchronized with the acquisition, with the at least one camera, that is to say with the same polarimetric camera 18 or with the same set of several conventional digital cameras 18.1, 18.2, of the at least two partial digital images necessary for the method, so as to:

acquire a primary series S1 of at least two partial digital images when the two-dimensional matrix 16c of liquid crystal cells is controlled such that the controlled polarization property of the light derived from a given liquid crystal cell 16c(i,j), follows a triangular variation as a function of the position of the elementary emitting area, associated with the given liquid crystal cell 16c (i,j), along the primary direction D1;

acquire a secondary series S2 of at least two partial digital images when the two-dimensional matrix 16c of liquid crystal cells is controlled such that the controlled polarization property of the light derived from a given liquid crystal cell 16c(i,j), follows a triangular variation as a function of the position of the elementary emitting area, associated with the given liquid crystal cell 16c (i,j), along a secondary direction D2 different from the primary direction D1, preferably orthogonal to the primary direction D1.

Thus, when passing from a given container 12 to the inspection location 13, the method could include the control of the two-dimensional matrix 16c of liquid crystal cells such that, successively, for the acquisition of the primary series of partial digital images of the given container, the controlled polarization property of the light derived from a given liquid crystal cell 16c(i,j) follows a triangular variation as a function of the position of the given cell liquid crystal 16c(i,j) along the primary direction D1, while being constant along a secondary direction D2 different from the primary direction D1, preferably orthogonal to the primary direction D1, then such that, for the acquisition of the secondary series of partial digital images, this same property of controlled polarization follows a triangular variation as a function of the position of the given liquid crystal cell 16c(i,j) along the secondary direction D2, while being constant along the primary direction D1.

In the case where the primary series and the secondary series are acquired at different moments, the movement of the containers 12 can be interrupted between the two moments so that, for the primary series and for the secondary series, the inspected container 12 is located exactly at the same position. However, it will be generally sought to maintain continuous movement of the containers. In the event of continuous movement of the containers, the acquisition of the primary series and of the secondary series at different moments necessarily implies that the inspected container 12 is at different positions for the two acquisitions. However, it can be expected that the acquisition frequency of the cameras currently available, and the speed of switching of the two-dimensional matrices 16c of liquid crystal cells, allow the movement of a container 12 between the acquisition of the primary series and the acquisition of the secondary series to be low, the container 12 remaining, in the time interval defined by these two moments, between the illumination device 16 used and the same polarimetric camera 18 or the same set of several conventional digital cameras 18.1, 18.2. For example, the time interval between the 2 acquisitions is of 1 ms while the containers move at a speed of 1 m/s, therefore move by 1 mm between two acquisitions. If the time interval between the 2 primary and secondary acquisitions increases, it is possible to plan for an offset in the inspection portion of the emitting surface in the direction of movement of the containers as explained previously.

Just as for the variation, along the primary direction D1, in the emitted polarization property of interest, the triangular variation, along the secondary direction D2, in the emitted polarization property of interest is such that each secondary period is preferably divided into only two parts, an increasing part and a decreasing part. In the increasing part, the emitted polarization property of interest is an increasing linear function of the position of the elementary emitting area along the secondary direction D2, the emitted polarization property of interest increasing from a secondary lower value to a secondary higher value, and, in the decreasing part, the emitted polarization property of interest is a decreasing linear function of the position of the elementary emitting area along the secondary direction D2, the emitted polarization property of interest decreasing from the secondary upper value to the secondary lower value. Likewise, as for the variation of the emitted polarization property of interest along the primary direction D1, the increasing part and the decreasing part of each secondary period are preferably of equal extent along the secondary direction D2.

With the acquisition of a secondary series of partial digital images as defined above, the method can therefore include the computer calculation of at least one secondary raw refraction image IR2, from the partial digital images IPk.2 of the secondary series S2, by calculating, for each of the elementary areas of the inspected area of the container 12, a secondary raw refraction pixel Pr2($n$), whose value is representative of the refraction undergone by the light having crossed at least a wall thickness of the container 12 and emerging from the elementary area, from the value of the corresponding partial pixels Ppk.2($n$) which are the image of the elementary area in the partial digital images IPK.2 of the secondary series S2.

To the extent that the polarization property of the lights emitted by the elementary emitting areas of the secondary inspection portion of the emitting surface 16$s$ follows a triangular variation as a function of the position of the elementary emitting area along the secondary direction D2, a secondary raw refraction pixel Pr2($n$) will have a value that will be representative of the refraction induced by the elementary area of the inspected area, in the sense that it will be representative of the refraction along the primary direction D2.

There will now be described different ways of computationally calculate a raw refraction image IRm from the partial digital images IPk.m of the corresponding series Sm by calculating, for each of the elementary areas of an inspected area of the container 12, a raw refraction pixel Prm($n$) whose value is representative of the refraction induced by the elementary area, from the value of the corresponding partial pixels Ppk.m($n$) which are the image of the elementary area in the partial digital images IPk.m of the corresponding series Sm.

For the mathematical formulas below, the case is preferably considered where the axes of polarization A1 and A2, corresponding respectively to the first partial image and to the second partial image of the series Sm considered, are orthogonal to each other. If, moreover, the mathematical formulas make use of the third partial image IP3.$m$ and of the fourth partial image IP4.$m$ of a given series Sm, the case is considered where the axes of polarization A3 and A4, corresponding respectively to the third partial image IP3.$m$ and to the fourth partial image IP4.$m$ of the series Sm considered, are orthogonal to each other, and oriented at 45° from the axes of polarization A1 and A2 corresponding respectively to the first partial image and to the second partial image of the series Sm considered, are orthogonal to each other, with thus two pairs A1, A2 and A3, A4 of orthogonal axes of polarization, the two pairs being offset from each other by 45 angle degrees.

two categories of embodiments will first be distinguished depending on the nature of the polarization of the light received at the level of the polarimetric camera 18 or, where appropriate, at the level of the linear analyzers 30.1, 30.2 of the conventional digital cameras 18.1, 18.2.

The method for a first category of embodiments which brings together the first, second and third types of embodiments is first described. In the first type of embodiments, the emitted polarization property of interest is the orientation θs(i,j) of the main axis of polarization of the polarized emitted light, which is then not modified by the system 10 between the emitting surface 16$s$ and the polarimetric camera 18 or, where appropriate, at the level of the linear analyzers 30.1, 30.2 of the conventional digital cameras 18.1, 18.2, except modification induced by a container 12. In the second and third types of embodiments, the presence of a quarter-wave retarder plate 16$d$, 34 in the path of the light makes it possible to recover, just as in the first type of embodiment, at the level of the polarimetric camera 18 or, where appropriate, at the level of the linear analyzers 30.1, 30.2 of the conventional digital cameras 18.1, 18.2, an elliptically (in some cases linearly) polarized light whose main axis of polarization has an orientation αr(n), which will hereinafter be called received polarization orientation αr(n). The received polarization orientation αr(n) is determined for each elementary area of the inspected area of the container 12. In other words, in the particular case of using a polarimetric digital camera 18, the received polarization orientation αr(n) is determined for each group of partial pixels which, in a master image acquired by a polarimetric camera, belong to the same composite pixel Pc(n).

The received polarization orientation αr(n) is determined with arbitrary reference to the orientation of the axis of polarization corresponding to one of the partial digital images of the series, for example the first partial digital image IP1.$m$. The received polarization orientation αr(n) is therefore the angular deviation between the main axis of polarization of the elliptically polarized light received at the level of the polarimetric camera 18 or, where appropriate, at the level of the linear analyzers 30.1, 30.2 of the conventional digital cameras 18.1, 18.2, and the axis of polarization A1 corresponding to the first partial digital image IP1.$m$. In the example developed, it is recalled that the first partial digital image IP1.$m$ is an image whose partial pixels Pp1.$m$ ($n$) are acquired through a polarization analyzer 30(1,$n$), 30.1 whose axis of polarization A1 is parallel to the axis of polarization A0 of the upstream linear polarizer 16$b$ of the illumination device 16. It is also recalled that, for the embodiments of the second type and of the third type of embodiments, a quarter-wave retarder plate 16$d$, 34 is interposed in the path of the light with its fast axis which is also parallel to the axis A0 of the upstream linear polarizer 16$b$ (but the same formulas also apply with a fast axis perpendicular to axis A0, with only a reversal of direction of rotation).

For this first category of embodiments, the calculation of the raw refraction image is based, for each raw refraction pixel Prm(n), on the Stokes parameters which, for any polarization, can be expressed along the following relationship, as a function of the received polarization orientation αr(n), of the polarization ellipticity E(n) and of the degree of polarization p(n) of the light received at the level of the polarimetric camera 18 or at the level of the linear analyzers 30.1, 30.2 of the conventional digital cameras 18.1, 18.2. This relationship can be written:

$$\begin{bmatrix} S0 \\ S1 \\ S2 \\ S3 \end{bmatrix} = p(n) \begin{bmatrix} 1 \\ \cos2\epsilon(n)\cos2\alpha r(n) \\ \cos2\epsilon(n)\sin2\alpha r(n) \\ \sin2\epsilon(n) \end{bmatrix} \qquad \text{[Math. 1]}$$

However, in a known manner, these same Stokes parameters can also be written in terms of intensity of the light received at the level of each photoelectric cell 28(k,n) corresponding to the elementary area:

$$\begin{bmatrix} S0 \\ S1 \\ S2 \\ S3 \end{bmatrix} = p(n) \begin{bmatrix} Pp1.m(n) + Pp2.m(n) \\ Pp1.m(n) - Pp2.m(n) \\ Pp3.m(n) - Pp4.m(n \\ \sqrt{S0^2 - S1^2 - S2^2} \end{bmatrix} \qquad \text{[Math. 2]}$$

From these two mathematical relationships, there can be deduced a first formula for calculating a value of the received polarization orientation $\alpha r(n)$ from only the values of two corresponding partial pixels Ppk.m(n) in the first partial image and the second partial image of the series Sm considered, this formula can be written:

$$\alpha r(n) = \arctan\sqrt{\frac{Pp2.m(n)}{Pp1.m(n)}} \qquad \text{[Math. 3]}$$

In cases where, for a given series Sm, there are 4 partial digital images corresponding to two pairs A1, A2 and A3, A4 of orthogonal axes of polarization, the two pairs being offset from each other by 45 angle degrees, it will be possible to calculate a value of the received polarization orientation $\alpha r(n)$ from the arc-tangent of ratio between, on the one hand, the difference in value of two corresponding partial pixels (Ppk.m(n)) in the first partial image and the second partial image and, on the other hand, the difference in value of the two corresponding partial pixels (Ppk.m(n)) in the third partial image IP3.m and the fourth partial image IP4.m, for example following the formula:

$$\alpha r(n) = \frac{1}{2} a\tan\left(\frac{Pp3.m(n) - Pp4.m(n)}{Pp1.m(n) - Pp2.m(n)}\right) \qquad \text{[Math. 4]}$$

In practice, this last case which is based on 4 partial digital images corresponding to two pairs A1, A2 and A3, A4 of orthogonal axes of polarization, the two pairs being offset from each other by 45 angle degrees, makes it possible to obtain a calculation of the received polarization orientation $\alpha r(n)$ which is less sensitive to noise and which therefore has the same sensitivity over the entire range of variation of the calculated value.

In this way, the triangular variation of the polarization property of the incident light emitted by the emitting surface 16c makes it possible to have, for the calculation of the value of the calculated raw refraction pixel, which value is representative, and is a function of the refraction undergone by the light emerging from the elementary area, a sensitivity which is substantially equal over the extent of the inspected area. A primary raw refraction pixel is therefore a measurement of the refraction In both cases, it is thus possible, for this first category of embodiments, to define the raw refraction image IRm for the series Sm as being a calculated digital image whose pixels Prm(n) each corresponding to an elementary area of the container are defined from the arc-tangent of a ratio between the values of two corresponding partial pixels Ppk.m(n) in the first partial image and the second partial image of the considered series Sm, for example by following the formula:

$$Prm(n) = \alpha r(n) \qquad \text{[Math. 5]}$$

In a second category of embodiments, which comprises the embodiments of the fourth type, an elliptically polarized light is recovered at the level of the polarimetric camera 18 or at the level of the linear analyzers 30.1, 30.2 of the conventional digital cameras 18.1, with a phase shift $\varphi r(n)$ between the two orthogonal components of the electric field vector, and with this phase shift $\varphi r(n)$ which varies. This phase shift will hereinafter be called received polarization phase shift $\varphi r(n)$. The received polarization phase shift $\varphi r(n)$ is determined for each elementary area of the inspected area of the container 12. In other words, in the particular case of using a polarimetric digital camera 18, the received polarization phase shift $\varphi r(n)$ is determined for each group of partial pixels which, in a master image acquired by a polarimetric camera 18, belong to the same composite pixel Pc(n).

For this second category of embodiments, the calculation of the raw refraction image is based on the following equations:

$$\begin{cases} Pp1.m(n) = I\cos^2(\varphi r(n)) & \text{[Math. 6]} \\ Pp3.m(n) = 0.5I \\ Pp2.m(n) = I\cos^2\left(\varphi r(n) + \frac{\pi}{2}\right) \\ Pp4.m(n) = 0.5I \end{cases}$$

From these mathematical relationships, it is possible to deduce a formula for calculating a value of the received polarization phase shift $\varphi r(n)$ from only the values of two corresponding partial pixels Ppk.m(n) in the first partial image and the second partial image of the series Sm considered, this formula can be written according to one of the two formulas below:

$$\varphi r(n) = \arctan\frac{Pp2.m(n)}{Pp1.m(n)} \qquad \text{[Math. 7]}$$

$$\varphi r(n) = \arctan\sqrt{\frac{Pp3.m(n) - 0.5Pp2.m(n)}{Pp4.m(n) - 0.5Pp1.m(n)}} \qquad \text{[Math. 8]}$$

It is thus possible to define, for this second category of embodiments in which an elliptically polarized light is recovered at the level of the polarimetric camera 18 or, where appropriate, at the level of the linear analyzers 30.1, 30.2 of the conventional digital cameras 18.1, 18.2, with a phase shift $\varphi r(n)$ between the two orthogonal components of the electric field vector which varies, the raw refraction image IRm for the series Sm as being a calculated digital image whose pixels Prm(n) each correspond to an elementary area of the container are defined from the arc-tangent of a ratio between the values of two corresponding partial pixels Ppk.m(n) in the first partial image and the second partial image of the series Sm considered, for example following the formula:

$$Prm(n) = \varphi r(n) \qquad \text{[Math. 9]}$$

In all cases, the raw refraction image IRm calculated using the methods and the devices described above then makes it possible, through an analysis of refraction anomalies, to detect refractive defects in the glass constituting the bottle. The analysis of refraction anomalies could possibly allow the detection of material distribution defects characterized by areas where the glass wall thickness varies greatly locally, leading to too thin wall portions. The refraction analysis step comprises a step of computer calculation based on the raw refraction image.

For example, the method can include a step of computationally calculating a gradient in the primary raw refraction image along the primary direction D1, respectively in the secondary raw refraction image along the secondary direction D2. Alternatively, the raw refraction image can for example be analyzed by comparing it by computer calculation with a reference image.

For the analysis of refraction anomalies, it is possible for example to computationally calculate, from the raw refraction image IRm, (resp. IR1, IR2), a refraction analysis image IARm (resp. IAR1, IAR2) composed of refraction analysis pixels Parm(n) (resp. Par1($n$) Par2($n$)) whose value represents the refraction, that is to say depends on the angles of deflection of the light rays deflected by the diopters made up of the surfaces of crossed glass walls.

According to a first series of refraction analysis methods, based on a deflection, the refraction analysis image is obtained by applying to the raw refraction image IR1 (respectively IR2) a low-pass filter, or a Sobel or Prewitt type gradient filter, oriented in the direction of variation respectively D1, respectively D2. Since the value deviation between neighboring raw refraction pixels Pr1($n$)-Pr1($n'$) (resp. Pr2($n$)-Pr2($n'$)) is proportional to the deflection of the corresponding light rays crossing the container, then in the refraction analysis image IAR1 (respectively IAR2) obtained, high values of refraction analysis pixels Par1($n$) (resp. Par2($n$)) correspond to strong refractions, average values correspond to medium refractions, low values correspond to low refractions. High refraction analysis pixel values Par(n) (resp. Par2($n$)) therefore correspond to refraction anomalies, therefore refractive defects, for example to locally very strong slope variations for the surfaces of the glass wall(s) corresponding to the high value refraction pixels.

A second series of refraction analysis methods is based on a comparison with an expected reference variation, corresponding to a defect-free container. It is possible to calculate values of theoretical refraction pixels Ptm(n), corresponding to a defect-free container, and obtain a refraction analysis image each refraction analysis pixel Parm(n) of which results from the comparison in pairs, for example by subtraction, of the raw refraction pixel Prm(n) with the value of the corresponding theoretical refraction pixel Ptm(n). Alternatively, the values of the theoretical pixels Ptm(n) can be calculated by analyzing the raw refraction pixels Prm(n) in the direction D1 (respectively D2) to determine by regression an optimal triangular function. When the values of the calculated refraction raw pixels do not correspond to the theoretical pixel values, the difference depends directly and proportionally on any refraction anomaly or deviation. In this case, the refraction analysis image IAR1, IAR2 can then be analyzed not only by applying a derivation or a gradient by computer calculation, to which a threshold is applied to detect refractive defects, but also the low spatial frequencies can be analyzed in order to determine regions of variation in glass distributions.

In this second series of refraction analysis methods, applied to a raw refraction image IR2 corresponding to a direction D2 perpendicular to the axis A12 of the container, it may be advantageous to take into account, in particular in the direction D2 (assumed here perpendicular to an axis of symmetry of revolution A12 of the container 12), the refraction predictable from the circular shape of the section of the cylindrical containers corresponding to the ideal model of a cylinder of constant thickness.

Other methods can be used to obtain the refraction analysis image, such as methods similar to phase unwrapping by computer calculation, as applied in deflectometry.

To obtain a given defect detection sensitivity, it will be necessary to adapt:

the period of the variation function of the emitted polarization property of interest;
the resolution of the light source;
the resolution of the digital camera.

This means that it will be necessary to adapt both the resolution of the partial images delivered by the digital camera(s), but also to adapt the scale at which are seen, in the partial image, on the one hand a primary or secondary period of variation of the polarization property of interest emitted in the emitting surface and on the other hand a possible refractive defect in the material of the inspected area of the container.

For this, it appeared optimal for a primary T1, respectively secondary T2, period of variation of the emitted polarization property of interest seen by the two-dimensional photoelectric sensor 22 of the digital camera(s), with a resolution, along the primary, respectively secondary D2, direction D1 of at least 15 partial pixels, for example in the range from 15 to 500 partial pixels, of the same partial digital image.

Preferably, the inspected area of the container 12 is seen by the two-dimensional photoelectric sensor 22 with a resolution, along the primary D1 respectively secondary D2 direction of at least 5 partial pixels of the same partial digital image per millimeter on the container.

To take into account the effect of contrast of the variation in the polarization property of interest emitted on the refractive defects, the dimensioning of the periods is considered at the level of the container 12 inspected, therefore for example at the level of its axis A12. Thus, a work plane W containing the axis A13 of the inspection location 13 and orthogonal to a plane defined by the axis A13 and the optical axis of the digital camera is defined by convention, as illustrated in FIGS. 11 and 12, and it is then possible to represent, as illustrated in FIGS. 11 and 12:

the periods T1 and T2 of variation in the variation function of the emitted polarization property of interest at the level of the emitting surface 16s along the respectively primary D1 and secondary D2 directions expressed in distance units, for example in millimeters;
the reduced periods Tr1 and Tr2 corresponding respectively to the periods T1 and T2, in the work plane W containing the axis A13, by a homothety of center O, O being the optical center of the objective lens 24 of the digital camera 18, the image periods Ti1 and Ti2 of variation in the received polarization property, considered in the optical image, therefore in the image plane, therefore on the two-dimensional photoelectric sensor 22, along the respectively primary D1 and secondary D2 directions expressed as a number of pixels on the digital sensor 22.

Preferably, the image periods Ti1 and Ti2 of variation in the received polarization image IR1 respectively IR2, are between 15 and 500 pixels For a resolution of the camera of 5 pixels per millimeter on the work plane W of the inspection location 13, and an image period Ti1 and Ti2 of variation in the received polarization image IR1 respectively IR2 of 15 pixels, the reduced periods Tr1 and Tr2 are of 3 millimeters.

For a resolution of the camera of 10 pixels per millimeter on the work plane W of the inspection location 13, and an image period Ti1 and Ti2 of variation in the received polarization image IR1 respectively IR2 of 500 pixels, the reduced periods Tr1 and Tr2 are of 50 millimeters.

In total, preferably, the reduced periods Tr1 and Tr2 are between 3 and 50 millimeters on the work plane W of the inspection location 13, the value being chosen in particular as a function of the size of the refractive defects wished to be detected.

The resolution of the source is such that the polarization property of interest emitted by the surface 16s varies for each half-period T1c, T1d (respectively T2c, T2d) between a minimum value P1min, (resp. P2min) and a maximum value P1max (resp. P2max) preferably through at least 16 increasing (respectively decreasing) intermediate values Pmi per constant pitch (or alternation of 2 different constant pitches). When the setpoint for each cell is an 8-bit word for example, over the half-period T1c, the setpoint varies for example from 0 for P1*min* to the setpoint 252 for P1*max* by 64 pitches of value 4.

The two-dimensional photoelectric sensor 22 and the objective lens 24 are for example chosen so that the resolution of each partial digital image is of 5 pixels per millimeter on the plane W, therefore at least substantially 5 pixels per millimeter on the container 12. Thus, the resolution of the raw refraction images IRMm is of at least substantially 5 raw refraction pixels per millimeter on the container 12.

The systems described above could advantageously be implemented to acquire, in addition to the images that have been described above, at least one complementary master image IM' which will make it possible to calculate a stress image of the inspected area and/or an intensity image for the inspected area, this in order to assess the presence of residual mechanical stresses, internal to the material of the container 12. It is more specifically recalled that a stress defect generally consists of a foreign body creating inner mechanical stresses in the glass material, that these stresses make the material birefringent, and that this birefringence appears as the polarization phase shift it induces in a polarized light that crosses this material. The stress image is a two-dimensional image calculated from a complementary master image IM', and in which each pixel is a polarization phase shift pixel Pd(n), that is to say a measurement as a polarization property of the emergent light from the container, of the phase shift between the 2 orthogonal components of the electric field vector of the light. For the acquisition of this complementary master image, the illumination device 16 is controlled such that the emitting surface 16s emits a polarized incident light which is uniform in terms of polarization over the entire extent of the inspection portion. Thus, any modification in the polarization state of the emergent light from the container will necessarily be due to a birefringence effect of the crossed material, therefore the anomalies in the measured polarization property will be related to stress defects in the material, and not to refraction. To do so, it will suffice to control the two-dimensional matrix 16c of liquid crystal cells such that the polarized light derived from each of the liquid crystal cells has an identical polarization for all the elementary emitting areas 16s(i,j) of the inspection portion.

From the complementary master image IM' thus acquired, the computer calculation of at least one stress image for the inspected area of the container could be carried out. This stress image is obtained, by computationally calculating, for the elementary areas of the inspected area of the container, a phase shift pixel Pd(n) which corresponds to each elementary area of the inspected area of the container (therefore corresponding to a composite pixel Pc(n) in the case of using a polarimetric digital camera 18) and whose value is representative of an induced polarization phase shift φ(n) by a residual mechanical stress located in the elementary area of the container corresponding to the composite pixel Pc(n), in the emergent light emanating from this elementary area of the container. It is understood that the value of an induced phase shift pixel Pd(n) is therefore an image of the intensity of the residual mechanical stresses in the material of the elementary area of the container.

To do so, a simple solution, when, as in FIG. 1, the system 10 does not comprise a quarter-wave retarder plate on the trajectory of the light, is to provide that the liquid crystal cells are kept at rest, with zero voltage control. When the liquid crystal cell technology is of the "TN" type, the cells generally cause, at rest, a rotation of the direction of the linear axis of polarization by 90°, therefore an angular offset of the orientation θs(i,j)=90° with respect to the axis of polarization A0 defined by the upstream linear polarizer. Thus the emitted light is linearly polarized at 90° from the direction of the axis of polarization A0 of the upstream linear polarizer over the entire inspection portion of the emitting surface 16s. When the technology of the liquid crystal cells makes it possible to control a phase shift φ16s(i,j) between the two orthogonal components of the electric field vector of the light, such as for example with "ECB" type technology, it is controlled with the maximum voltage to eliminate birefringence, and as there is no birefringence created, therefore no phase shift, the emitted light is linearly polarized in the direction of the axis of polarization A0 of the upstream linear polarizer 16b on the entire inspection portion of the emitting surface 16s. In both cases, the incident light on the container 12 is, at all points, a linearly polarized light with a common axis of polarization. In the same way with a system comprising a quarter-wave retarder plate 16d in the illumination device 16, this quarter-wave retarder plate 16d having a fast axis parallel to the axis of polarization A0 defined by the upstream linear polarizer 16b, for example as illustrated in FIG. 2, it exits from the linearly polarized emitted light over the entire inspection portion of the emitting surface 16s parallel or orthogonal to the direction of polarization of the upstream linear polarizer 16b.

In this case, a phase shift image can be calculated, in which the calculation of each phase shift pixel Pd(n) corresponding to an elementary area of the container is performed from the value of at least the partial pixel Pp'2(*n*) which corresponds to the elementary area of the container and which appears in the first complementary partial image IP'2 associated with the linear analyzer having its axis of polarization A2 perpendicular to the axis of polarization A0 of the incident light. For example, each phase shift pixel Pd(n) is the value of the partial pixel Pp'2(n), with therefore:

$$Pd(n)=Pp'2(n).$$

FIG. 3 illustrates a configuration that can be used to implement another mode of creation of the stress image which consists in using a circularly polarized incident light and analyzing it by filtering the emergent light from the container 12 using the quarter-wave retarder plate 34. The liquid crystal cell technology is used to monitor the bire-fringence of the cells in order to create a phase shift between the two orthogonal components of the electric field vector of the light, for example with the "ECB" type technology. The two-dimensional matrix 16c of liquid crystal cells is con-trolled such that the polarized light derived from each of the liquid crystal cells has the same phase shift $\phi16c(i,j)$ between the two orthogonal components of the electric field vector of the light derived from the liquid crystal cell, identical for all the cells. The ECB cells have a variable birefringence depending on the control and behave like a retarder plate whose fast axis is at 45° from the direction of the upstream linear axis of polarization A0 and whose retarder can be modified by the voltage applied to each cell, to correspond to a quarter wavelength, which induces a phase shift $\phi16c(i,j)$ of 90 angle degrees. Since the fast axis of the birefringence is at 45° from the upstream linear polarization direction A0, the emitted light is circularly polarized over the entire inspection portion of the emitting surface 16s.

The case where the system comprises a quarter-wave retarder plate 34 downstream of the inspection location 13 is described, this quarter-wave retarder plate 34 having a fast axis parallel to the axis of polarization A0 defined by the upstream linear polarizer 16b, as in the example of FIG. 3 which also implements a polarimetric camera. The axis A1 being parallel to the axis of polarization A0 of the upstream linear polarizer 16b, the quarter-wave retarder plate 34 has a fast axis parallel to the axis of polarization A1 of the individual polarizing filters 30(n,1)), therefore at less 45 angle degrees from the axis of polarization A3 of the individual polarizing filter 30(n,3), at more 45 angle degrees from the axis of polarization A4 of the individual polarizing filter 30(n,4). In such a case, in the absence of modification of the polarization of the incident light by a stress defect, the light transmitted by the quarter-wave retarder plate 34 becomes linearly polarized along a downstream linear polar-ization direction orthogonal to the axis of polarization A4 and parallel to the axis of polarization A3, so that the partial pixel Pp'4(n) is zero, that is to say there is extinction. In the presence of a modification of the polarization of the incident light by a stress defect, the light transmitted by the quarter-wave retarder plate 34 becomes linearly polarized along a downstream linear polarization direction not orthogonal to the axis of polarization A4, so that the partial pixel Pp'4(n) is normally non-zero with a value that depends on the constraint.

In this case, the computer calculation of each phase shift pixel Pd(n) corresponding to an elementary area of the container 12 is performed from the value of at least the partial pixel Pp'4(n), and possibly also from of the value of the partial pixel Pp'3(n) which correspond to the elementary area of the container and which appear in the complemen-tary partial images IP'4, IP'3 associated with the linear analyzer 30(n,4), 30(n,3) having their axis of polarization at 45 angle degrees from the fast axis of quarter-wave retarder plate 34, therefore at 45 angle degrees from the axis of polarization A0 of the incident light. Preferably, the computer calculation of each phase shift pixel Pd(n) correspond-ing to an elementary area of the container is performed from the value of the two partial pixels Pp'4(n) and Pp'3(n) which correspond to the elementary area of the container and which appear in the two complementary partial images IP'4, IP'3 each associated with the linear analyzers having their axes of polarization at 45 angle degrees from the fast axis of quarter-wave retarder plate 34, in one direction or the other. Under these conditions, a first formula for calculating a value of each phase shift pixel Pd(n) corresponding to an elementary area of the container can be written:

$$Pd(n) = 2\arctan\frac{Pp'4.m(n)}{Pp'3.m(n)} \qquad \text{[Math. 10]}$$

Under the same conditions, a second formula for calcu-lating a value of each phase shift pixel Pd(n) corresponding to an elementary area of the container can be written:

$$Pd(n) = \arccos(Pp'3(n) - Pp'4(n)) \qquad \text{[Math. 11]}$$

In the case where there is a circularly polarized emitted light and a quarter-wave retarder plate in front of the objective lens of the polarimetric camera, with the calcula-tion according to the Math 11 equation above, there is an isotropic measurement of the stress defects with a sensitivity that depends on the strength of the inner mechanical stresses. The two-dimensional stress image containing the phase shift pixels Pd(n) can be analyzed by any known means of image processing, such as high-pass filters, gradients, comparisons of pixels with the average of the neighboring pixels in the stress image, or comparisons of the phase shift pixels Pd(n) with a reference phase shift value corresponding to a maxi-mum tolerated stress.

Whatever the polarization properties of the emitted light, it is possible to calculate from at least two partial images or a master image, an image of intensity It, in which the value of each intensity pixel Pt(n), represents only the intensity of light emerging from an elementary area of the inspected area of the container and therefore mainly represents the absorp-tion of the light having crossed at least one wall of the container 12. The value of each intensity pixel Pt(n) is calculated as an averaged value of the value of at least two partial pixels Pp'1(n), Pp'2(n) corresponding to the same elementary area of the container in at least one pair of two complementary partial digital images for which the axes of polarization A1, A2 of the linear analyzers are orthogonal to each other. The detection of any local intensity anomaly makes it possible to detect mainly defects absorbing the light. Thus, the value of each intensity pixel Pt(n) of the intensity image It can therefore be calculated for example in the form:

$$Pt(n) = Pp'1 + Pp'2(n).$$

If a polarimetric digital camera 18 is used, it is possible, from a single master image IM or IM', to have 4 partial digital images corresponding to two pairs A1, A2 and A3, A4 of orthogonal axes of polarization, the two pairs being offset from each other by 45 angle degrees. In this case, it is also possible to calculate the value of each intensity pixel Pt(n) of the intensity image by following either of the following formulas:

$$Pt(n) = Pp3(n) + Pp4(n), \text{ or } Pt(n) = Pp'3(n) + Pp'4(n), \text{ or }$$

$$Pt(n) = Pp1(n) + Pp2(n) + Pp3(n) + Pp4(n), \text{ or }$$

$$Pt(n) = Pp'1 + Pp'2(n) + Pp'3(n) + Pp'4(n)$$

In the present text, an averaged value can be for example an arithmetic average or the like, weighted or not, etc. For example, as in the examples given above, an averaged value of two values can be the sum of these two values.

The intensity image It can be calculated whatever the polarization properties of the emitted light, therefore with a property variation in the direction D2 or in the direction D2 or without property variation as expected to obtain the stress image. It can be calculated from any master image IM or complementary master image IM'.

The intensity image It containing the intensity pixels Pt(n) can be analyzed by any known image processing means, as described above (for example high-pass spatial filters, gradients, comparisons of pixels with the average of the neighboring pixels in the intensity image, etc.) to detect in particular defects absorbing the light.

In other words, it is possible to:

control the light source so that the emitting surface 16s produces a light with a variation in the polarization property along the direction D1, acquire a master image IM, calculate a raw refraction image IR1 and deduce therefrom a refraction analysis image IAR1 to identify the refractive defects;

based on the same master image IM, calculate an intensity image It to identify absorption defects.

Moreover, for a given inspected area of a given container, the phase shift image ID and the intensity image It can be calculated from the same single complementary master image IM' acquired by a polarimetric digital camera 18. This complementary master image IM' can be acquired with the same polarimetric digital camera 18, and with the same illumination device 16 as the one implemented to acquire the master image IM used to calculate the raw refraction image IRm as defined above. However, this complementary master image IM' is acquired at a moment that is different from the moment of acquisition of the master image IM used to calculate the raw refraction image IRm with the same polarimetric digital camera 18, and with the same illumination device 16. Between the two acquisition moments, the two-dimensional matrix 16c of liquid crystal cells is controlled to switch from either of two configurations among:

a refraction acquisition configuration in which, on the primary inspection portion of the emitting surface, there is obtained, along a primary direction D1 of the emitting surface, a triangular variation of the phase shift φ16c(i,j) induced, in an initially linearly polarized light, by the liquid crystal cell 16c(i,j) it crosses, as a function of the position of the elementary emitting area along the primary direction D1, this triangular variation having several successive primary periods with such a triangular variation of the polarization property as a function of the position of the elementary emitting area 16s(i,j) along the primary direction D1.

and a stress acquisition configuration in which there is obtained, for all the liquid crystal cells 16c(i,j) of the two-dimensional matrix 16c, a common value of the phase shift φ16c(i,j) induced, in an initially linearly polarized light, by the liquid crystal cell 16c(i,j) it crosses, during the acquisition of the complementary image(s).

Thus, with the same system 10 comprising a single polarimetric camera and a single illumination device, it is possible to calculate at least three distinct images containing information respectively relative to:

the refraction induced by the container in the light emerging from each elementary area of the inspected area, the absorption induced by the container in the light emerging from each elementary area of the inspected area, the inner mechanical stresses in the material of the container, for each elementary area of the inspected area.

With a system 10 having a single illumination device comprising a two-dimensional matrix 16c of liquid crystal cells and a single polarimetric camera, it is possible to acquire two or three master images and calculate three or four images among:

a refraction image along a direction D1;

an intensity image;

a refraction image along a direction D2 different from D1, for example perpendicular to D1;

a stress image.

In the present text, therefore in all the calculations of the pixels used in this invention, the calculated pixel values can be obviously encoded in floating point or normalized to be brought to numerical values for example on 8 or 16 or 24 bits.

The invention claimed is:

1. An optical computing method for inspecting in through light a glass container moving along a movement trajectory, wherein:

the method includes illumination of the container by an illumination device comprising at least one two-dimensional emitting surface which is arranged on one side of the movement trajectory and which is made up of elementary emitting areas each emitting a polarized emitted light with an emitted polarization property of interest which varies according to a law of periodic variation as a function of a position of the elementary emitting area in the emitting surface;

the method includes an observation of the container, by at least one digital camera having a two-dimensional photoelectric sensor comprising photoelectric elements which each comprise a photoelectric cell corresponding to a pixel in an image acquired by the digital camera, the at least one digital camera being located, with respect to the movement trajectory, on a side opposite to that of the illumination device, so as to collect, by the at least one digital camera, an emergent light emanating from the container and having crossed at least one wall thickness of the container;

the method includes the acquistion, with the at least one digital camera, of partial digital images, each containing an image of the same inspected area of the container, each partial digital image having N partial pixels each of which is the image of a corresponding elementary area of the container, and each partial digital image being acquired with interposition, between the container and the photoelectric cells of the at least one digital camera, of a linear analyzer having a given axis of polarization, for a partial digital image;

the acquisition further includes another acquisition of at least one series comprising at least a first partial digital image and a second partial digital image, for which the axes of polarization of the linear analyzers are distinct from each other, the partial digital images of the same series being superimposable such that each elementary area of the inspected area of the container is imaged by a corresponding partial pixel in each of the partial digital images of the series;

for a primary series, the partial digital images of the primary series each contain, in the background, the image of the same primary inspection portion of the emitting surface, the primary inspection portion being observed through the container by the digital camera, and, on the primary inspection portion of the emitting surface, the law of periodic variation of the emitted polarization property of interest having, along a primary direction, a primary periodic variation, and having several primary periods over the extent of the primary inspection portion along the primary direction;

wherein, over a primary period, the emitted polarization property of interest of the lights emitted by the elementary emitting areas of the primary inspection portion of the emitting surface follows a triangular variation as a function of the position of the elementary emitting area along the primary direction, and in that the method includes a computer calculation of at least one primary raw refraction image, from the partial digital images of the primary series, by calculating, for each of the elementary areas of an inspected area of the container, a primary raw refraction pixel whose value is representative of the refraction undergone by the light having crossed at least one wall thickness of the container and emerging from the elementary area, from the value of the corresponding partial pixels which are the image of the elementary area in the partial digital images of the primary series.

2. The method according to claim 1, wherein, for the same inspected area of the same container, the method includes the acquisition, for the primary series, of a third partial digital image and of a fourth partial digital image for which the axes of polarization of the linear analyzers are distinct from each other and distinct from the axes of polarization of the linear analyzers for the first partial digital image and the second partial digital image of the primary series, preferably orthogonal to each other and offset by 45 angle degrees of the axes of polarization of the linear analyzers for the first partial digital image and the second partial digital image of the primary series.

3. The method according to claim 1, wherein, for the same inspected area of the same container, the acquisition includes the acquisition of at least one secondary series of partial digital images;

in that, for the secondary series, the partial digital images each contain, in the background, the image of the same secondary inspection portion of the emitting surface, the secondary inspection portion being observed through the container by the digital camera, and, on the secondary inspection portion of the emitting surface, the law of periodic variation of the emitted polarization property of interest having, along a secondary direction of the emitting surface, different from the primary direction, a secondary periodic variation, and having several secondary periods over the extent of the secondary inspection portion along the secondary direction;

in that, over a secondary period, the emitted polarization property of interest of the lights emitted by the elementary emitting areas of the secondary inspection portion of the emitting surface follows a triangular variation as a function of the position of the elementary emitting area along the secondary direction, and in that the method includes the computer calculation of at least one secondary raw refraction image, from the partial digital images of the secondary series, by calculating, for each of the elementary areas of an inspected area of the container, a secondary raw refraction pixel whose value is representative of the refraction undergone by the light having crossed at least one wall thickness of the container and emerging from the elementary area, from the value of the corresponding partial pixels which are the image of the elementary area in the partial digital images of the secondary series.

4. The method according to claim 1, wherein it comprises the calculation, from at least two partial digital images, of an intensity image it in which the value of each intensity pixel is calculated as an averaged value of the value of at least two partial pixels and corresponding to the same elementary area.

5. The method according to claim 1, characterized in that it comprises the acquisition of at least one complementary master image (IM') so as to calculate a stress image of the inspected area and/or an intensity image for the inspected area.

6. The method according to claim 1, wherein the at least one digital camera is a polarimetric digital camera, having a two-dimensional photoelectric sensor comprising photoelectric elements which each comprise a photoelectric cell in front of which is arranged an individual linear analyzer associated with the photoelectric cell of this photoelectric element, the photoelectric sensor including a number N of distinct groups of 4 contiguous photoelectric elements whose individual linear analyzers have each an an axis of polarization, the four axes of polarization of a given group of 4 photoelectric elements forming two pairs, of orthogonal axes of polarization, the two pairs being offset from each other by 45 angle degrees;

and in that the acquisition of the 4 partial digital images of the same series is performed, with the photoelectric sensor of the polarimetric camera, by the acquisition of a master digital image containing an image of the container, the master digital image having a number 4*N of master pixels grouped into N composite pixels each corresponding to a group of contiguous photoelectric elements, each composite pixel having 4 master pixels each corresponding to one of the elements of the group of contiguous photoelectric elements corresponding to this composite pixel, and each master digital image comprising the 4 distinct partial digital images each having N partial pixels, the partial pixels of each of the partial digital images corresponding, for a given partial digital image, to the photoelectric elements of the photoelectric sensor whose individual linear analyzers have a common axis of polarization for this partial digital image.

7. The method according to claim 1, wherein the triangular variation is such that each primary period is divided into only two parts, an increasing part and a decreasing part, in that, in the increasing part, the emitted polarization property of interest is an increasing linear function of the position of the elementary emitting area along the primary direction, the emitted polarization property of interest increasing from a primary lower value to a primary upper value, and in that, in the decreasing part, the emitted polarization property of interest is a decreasing linear function of the position of the elementary emitting area along the primary direction, the emitted polarization property of interest decreasing from the primary upper value to the primary lower value.

8. The method according to claim 1, wherein the inspection portion of the emitting surface is made up of elementary emitting areas each emitting an elliptically polarized emitted light having an ellipticity ratio less than or equal to 0,7, and in that the emitted polarization property of interest of the light emitted by an elementary emitting area is the orientation of the main axis of polarization of the light emitted by said elementary emitting area.

9. The method according to claim 1, wherein the primary inspection portion of the emitting surface is made up of elementary emitting areas each emitting a polarized emitted light according to an elliptical polarization with a phase shift between the two orthogonal components of the electric field vector of the polarized emitted light, and in that the emitted polarization property of interest corresponds to the phase shift between the two orthogonal components of the electric field vector of the polarized emitted light.

10. The method according to claim 1, wherein the illumination device includes, in the direction of propagation of the light, a primary two-dimensional source of diffused light, an upstream linear polarizer having a axis of polarization, and a two-dimensional matrix of liquid crystal cells.

11. The method according to claim 10, wherein it includes the control of the two-dimensional matrix of liquid crystal cells such that the polarized light derived from each of the liquid crystal cells has an elliptical polarization with, for each liquid crystal cell, the orientation of the main axis of polarization and/or a phase shift between the two orthogonal components of the electric field vector of the light derived from the liquid crystal cell, and in that, for the acquisition of the primary series of partial digital images, the at least one among the orientation of the main axis of polarization and/or the phase shift follows a triangular variation as a function of the position of the liquid crystal cell along the primary direction.

12. The method according to claim 1, wherein it includes a step of analyzing refraction anomalies comprising a step of computer calculation based on the raw refraction image.

13. An optical computing system for inspecting in through light, by using at least one digital camera, a glass container moving along a movement trajectory, in which:

the system includes an illumination device comprising at least one two-dimensional emitting surface, arranged on one side of the movement trajectory and which is made up of elementary emitting areas each emitting a polarized emitted light having a polarization property;

the system includes at least one digital camera with a two-dimensional photoelectric sensor comprising photoelectric elements which each comprise a photoelectric cell, the at least one digital camera, being located, with respect to the movement trajectory, on the side opposite to that of the illumination device, so as to collect, by the at least one digital camera, an emergent light emanating from the container and having crossed at least one wall thickness of the container;

the system is configured to acquire, with the at least one digital camera, at least one series including two partial digital images, each containing an image of the same inspected area of the container, each partial digital image having N partial pixels each of which is the image of a corresponding elementary area of the container, and each partial digital image being acquired with interposition, between the container and the photoelectric cells of the at least one digital camera, of a linear analyzer with a given axis of polarization for a partial digital image, the axes of polarization of the linear analyzers for the at least two partial digital images being distinct from each other, the partial digital images of the same series being superimposable such that each elementary area of the inspected area of the container is imaged by a corresponding partial pixel in each of the partial digital images of the series;

wherein the illumination device includes, in the direction of propagation of the light, a primary two-dimensional source of diffuse light, an upstream linear polarizer having an axis of polarization, and a two-dimensional matrix of liquid crystal cells, wherein a quarter-wave retarder plate is arranged in the light path between the container and the linear analyzers for the at least two partial digital images.

14. The system according to claim 13, wherein the system includes means for controlling the two-dimensional matrix of liquid crystal cells such that the polarized light derived from each of the liquid crystal cells has an elliptical polarization with, for each liquid crystal cell, an orientation of the main axis of polarization and/or a phase shift between the two orthogonal components of the electric field vector of the light derived from the liquid crystal cell, and in that the illumination device is controlled such that the at least one among the orientation of the main axis of polarization and/or the phase shift follows a variation as a function of the position of the liquid crystal cell along a primary direction of the emitting surface.

15. The system according to claim 14, wherein the illumination device is controlled such that at least one among the orientation of the main axis of polarization and/or or the phase shift follows a triangular variation as a function of the position of the liquid crystal cell along a primary direction of the emitting surface.

16. The system according to claim 13, wherein it includes, in the light path between the two-dimensional matrix of liquid crystal cells and the linear analyzers for the at least two partial digital images, the quarter wave retarder plate which has a fast axis oriented parallel or perpendicular to the axis of polarization of the upstream linear polarizer.

* * * * *